United States Patent [19]
Hube

[11] Patent Number: 5,436,730
[45] Date of Patent: Jul. 25, 1995

[54] METHOD OF MANAGING A PROOF APPROVAL PROCESS FOR PROOFING DOCUMENTS IN A PRINTING SYSTEM

[75] Inventor: Randall R. Hube, Rochester, N.Y.

[73] Assignee: Xerox Corporation, Stamford, Conn.

[21] Appl. No.: 270,282

[22] Filed: Jul. 5, 1994

[51] Int. Cl.6 .......................... H04N 1/21; H04N 1/23
[52] U.S. Cl. .................................... 358/401; 358/444; 358/468; 395/115
[58] Field of Search ............... 358/401, 444, 452, 448, 358/468, 296, 300; 395/115, 117, 600

[56] References Cited

U.S. PATENT DOCUMENTS

| | | | |
|---|---|---|---|
| 4,503,499 | 3/1985 | Mason et al. | 364/200 |
| 4,829,468 | 5/1989 | Nonaka et al. | 364/900 |
| 5,130,806 | 7/1992 | Reed et al. | 358/296 |
| 5,164,842 | 11/1992 | Gawonski et al. | 358/401 |
| 5,243,381 | 9/1993 | Hube | 355/204 |
| 5,367,673 | 11/1994 | Goldsmith et al. | 395/600 |
| 5,400,243 | 3/1995 | Oheda et al. | 358/452 |

OTHER PUBLICATIONS

Michael D. Zisman, "Office Automation: Revoluton or Evolution?" Sloan Management Review, Spring 1978, pp. 1–16.

Michael D. Zisman, "Representation, Specification and Automation of Office Procedures", 1977, pp. 1–224.

Primary Examiner—Scott A. Rogers
Attorney, Agent, or Firm—Gary B. Cohen

[57] ABSTRACT

A method of printing a selected print job, in a printing machine with a job file communicating with a print queue, is provided. The method includes the step of transmitting, to a proof user, a representation of at least a segment of the selected print job and a special instruction sheet. Preferably, the special instruction sheet has a proof event code and instructions regarding both a manner in which the proof user is to review the selected print job segment and provide proof-related information, regarding the selected print job segment, to the database. In practice, the proof-related information of the selected print job segment, with its corresponding proof event code, is received at the database and the database is updated by reference to the proof event code. In response to the updating, a copy of the selected print job is moved, from the job file to the print queue, so that prints, representative of the selected print job, are produced.

30 Claims, 18 Drawing Sheets

| JOB ID | SEG-MENT IDEN-TIFIER | PROOF EVENT CODE | PROOFER IDENTIFICATION | | | SPECIAL INSTRUCTIONS TO PROOFER | DUE DATE | PROOF DECISION |
|---|---|---|---|---|---|---|---|---|
| | | | NAME | LOCATION | PHONE | | | |
| JOB-01 | 1 | 056 | John Smith | Bldg 066-34B | 34600 | | 6/17/93 | |
| JOB-01 | 1 | 057 | M. Thomas | Bldg 106-21A | 46725 | Check grammar only | 6/17/93 | Approved |
| JOB-01 | 2 | 058 | F. Jones | Bldg 340-24C | 46783 | Check grammar only | 6/17/93 | Approved |
| JOB-01 | 2 | 059 | M. Hopkins | AT&T HQ | 321-2000 | | 6/17/93 | Approved |
| JOB-23 | 3 | 060 | Pam Black | Bldg 801-34A | 55293 | Coordinate w/John | 6/21/93 | Hold |
| JOB-23 | 3 | 061 | Shop Mg'r | LOCAL | | | 6/21/93 | |
| JOB-45 | 4 | 062 | Pam Black | Bldg 801-34A | 55293 | | 6/19/93 | Approved w/comments |
| JOB-45 | 4 | 063 | Ted Casper | Bldg 902-16N | 43055 | | 6/19/93 | |
| JOB-45 | 5 | 064 | Clyde Derr | 803 Apple La. | 555-1656 | See revised Fig. 41 | 6/19/93 | Approved |
| JOB-45 | 5 | 065 | Sam Austin | Bldg 066-34B | 52364 | | 6/19/93 | Approved w/comments |
| JOB-45 | 5 | 066 | Carol Ho | 91 Lake St. | 311-9999 | | 6/19/93 | Approved |
| JOB-97 | 6 | 067 | M. Hopkins | Bldg 065-928 | 21212 | | 6/15/93 | |

FIG. 6

| JOB ID | SEG-MENT IDEN-TIFIER | PROOF EVENT CODE | PROOFER IDENTIFICATION ||| SPECIAL INSTRUCTIONS TO PROOFER | DUE DATE | PROOF DECISION |
|---|---|---|---|---|---|---|---|---|
| | | | NAME | LOCATION | PHONE | | | |
| JOB-01 | 1 | 056 | John Smith | Bldg 066-34B | 34600 | | 6/17/93 | |
| JOB-01 | 1 | 057 | M. Thomas | Bldg 106-21A | 46725 | Check grammar only | 6/17/93 | Approved |
| JOB-01 | 2 | 058 | F. Jones | Bldg 340-24C | 46783 | Check grammar only | 6/17/93 | Approved |
| JOB-01 | 2 | 059 | M. Hopkins | AT&T HQ | 321-2000 | | 6/17/93 | Approved |
| JOB-23 | 3 | 060 | Pam Black | Bldg 801-34A | 55293 | Coordinate w/John | 6/21/93 | Hold |
| JOB-23 | 3 | 061 | Shop Mg'r | LOCAL | | | 6/21/93 | |
| JOB-45 | 4 | 062 | Pam Black | Bldg 801-34A | 55293 | | 6/19/93 | Approved w/comments |
| JOB-45 | 4 | 063 | Ted Casper | Bldg 902-16N | 43055 | | 6/19/93 | |
| JOB-45 | 5 | 064 | Clyde Derr | 803 Apple La. | 555-1656 | See revised Fig. 41 | 6/19/93 | Approved |
| JOB-45 | 5 | 065 | Sam Austin | Bldg 066-34B | 52364 | | 6/19/93 | Approved w/comments |
| JOB-45 | 5 | 066 | Carol Ho | 91 Lake St. | 311-9999 | | 6/19/93 | Approved |
| JOB-97 | 6 | 067 | M. Hopkins | Bldg 065-928 | 21212 | | 6/15/93 | |

To: John Smith
Location: W066-34A
Proofer
Event Code: 056

*Instructions:*

1) Please review the attached document for approval to print.

2) When your review is complete and you are ready to provide your response, please call the following number from a touch tone phone.

1-800-555-1234

Be prepared to enter the Proofer Event Code indicated at the top of this sheet.

METHOD OF MANAGING A PROOF APPROVAL PROCESS FOR PROOFING DOCUMENTS IN A PRINTING SYSTEM

The present invention relates generally to a technique for producing one or more prints from a stored print job and, more particularly, to a method of managing a proof process for a document, stored in a memory of a printing machine, so that when certain preselected proof-related information is received at the printing machine, the one or more prints are produced.

An electronic printing system, such as one manufactured by Xerox Corporation, under the product name of "DocuTech®", is capable of storing a job, in electronic form, for printing at a later time. As indicated in U.S. Pat. No. 5,164,842 to Gauronski et al (Issued: Nov. 17, 1992), the pertinent portions of which are incorporated herein by reference, it may be desirable to use the electronic printing system to "proof" a single copy of the job prior to printing multiple copies of the same. Pursuant to "proofing" the job, a copy of the stored job is delivered to a print queue of a print engine and inserted into the queue at an appropriate location for eventual printing. Through this proofing process, a user of the printing system is provided the opportunity to verify, among other things, that the job is assembled properly, image quality is acceptable and finishing is specified properly.

Although the current proof process of the DocuTech is very useful within a print shop environment, the process is based on a model that is not always suitable for optimizing print shop work flow. In particular, for many "publishing environments, where document creation/publishing costs are relatively high because, for instance, a significant amount of document editing is required, or incorrect documentation can pose severe negative implications, in such areas as law, medicine and finance, a rather complex proofing process can be required. The process can involve sending a proof job by, for instance, mail to multiple recipients who, most likely, are disposed remotely of the print shop, and then waiting for each of the recipients to respond with approval or rejection of their proof. In certain cases, an approval or rejection may be conditioned on the performance of a given action, which given action may be stated in the form of comments. In one example, such comments may be conveyed by way of a telephone call to a print shop employee, a "marked-up" version of the proof job or an electronic communication (e.g. "E-Mail").

The above-described process of supplying comments has at least two significant implications relative to the print shop. First, the print shop will, most likely, have to wait a significant amount of time for recipients to receive, review and respond to the proof (e.g. days or even weeks). During this time, the print shop must retain the job on the printer and move on to other work, i.e. the storing and processing of other jobs. Second, due to the first implication, and the multiplicity of the the recipients, the print shop is obligated to track, status and manage a significant number of outstanding proofs (and other associated jobs) at any particular time.

Currently, the means that a print shop typically uses to track, status and manage outstanding proofs may range from the informal, such as maintaining a written or unwritten record, to the formal, such as maintaining a record on a computer. In either circumstance a significant amount of human intervention is required through such processes as receiving telephone communications, taking notes and/or inputting information to a computer. During such processes, the chance of encountering error or delay is highly probable. For example, delay may occur when an appropriate print shop operator is not available to take a call and up date information. In the end there can be considerable cost associated with supporting such a system and additional costs can be incurred when productivity and customer satisfaction are reduced as a result of errors and delay.

The following prior art suggests techniques for improving work flow in either a network or office context:

U.S. pat. No. 4,503,499 Patentees: Mason et al. Issued Mar. 5, 1985

"Office Automation: Revolution or Evolution?"Author: Michael D. Zisman Published by Massachusetts Institute of Technology in 1978

U.S. Pat. 4,503,499 discloses a work flow system in which paperwork, to be performed with respect to a given project is divided into individual tasks each performed by one individual on one document. A file is created in, a memory of a central processor for each project containing a schedule of tasks to be performed in the project, identifying the persons who are to perform the tasks, the identification of the documents on which the tasks are to be performed and an identification of what other tasks have to be completed before each task can be started. A program is executed by the central data processor to operate on the files in the central processor memory containing the scheduled tasks and notifies the workers who are to perform the tasks when the tasks are ready to be performed. The program, in response to requests from the workers, causes the central processor to send, electronically, the necessary documents to the remote processor where the persons who are to perform the tasks are located.

The Office Automation article discloses how certain office functions might be automated through use of a stage hypothesis. In one example, the manner in which a journal editing procedure might evolve in an office automation environment is examined. In the most advanced stage of office automation, a computer system assumes the role of secretary in facilitating the journal editing procedure. For instance, as indicated on p. 13 of the article:

> The system will now determine that, since it has the names of referees for the paper, it should send a message (probably through the computer network) to the selected referees by instructing the document generation subsystem to transmit a form letter filled in with some variable information. If the computer system does not receive a response from the referees within some specified period, it will automatically take action to correct the situation (this might involve sending out a reminder notice or informing the editor). The process would continue until a decision is made on the paper, with the computer system automatically "tracking" each paper and managing the routine control functions.
>
> In effect, the computer system now assumes the role of the secretary. It detects inputs, consults procedures to determine what actions should be taken, and generates outputs. The outputs may be messages to other parties (the computer system is acting as an intelligent message switch) or instructions to other office systems. The computer system can also react when expected events do not occur within specified time periods.

Thus, a large portion of the routine and almost routine work done by a secretary can be automated, once we change our focus from device mechanization to process automation.

The use of a computer model to implement the above-described journal editing procedure is provided in the following reference, the pertinent portions of which are incorporated herein by reference:

"Representation, Specification and Automation of Office Procedures" Ph.D Thesis of Michael D. Zisman University of Pennsylvania 1977

While the above-described journal editing procedure is useful in supervising a procedure associated with generating a document, namely a journal article, it does not contemplate a system in which the document is actually handled, in a physical sense. That is, the journal editing procedure does not facilitate the storing and/or imaging of a document. It would be desirable to provide a system that would manage both the editing and the generating of the document. More particularly, the system would, in conjunction with the managing of the editing, receive, store and generate the document at suitable time stages.

The present invention employs network capability to achieve various advantageous ends. The following discussion is intended to provide a background for any appropriate network implementation required by the disclosed embodiment below:

Examples of some recent patents relating to network environments of plural remote terminal shared users of networked printers include Xerox Corporation U.S. Pat. Nos. 5,243,518, 5,226,112, 5,170,340 and 5,287,194. Some patents on this subject by others include U.S. Pat. Nos. 5,113,355, 5,113,494 (originally filed Feb. 27, 1987), 5,181,162, 5,220,674, 5,247,670; 4,953,080 and 4,821,107. Further by way of background, some of the following Xerox Corporation U.S. Pat. Nos. also include examples of networked systems with printers: 5,153,577; 5,113,517; 5,072,412; 5,065,347; 5,008,853; 4,947,345; 4,939,507; 4,937,036; 4,920,481; 4,914,586; 4,899,136; 4,453,128; 4,063,220; 4,099,024; 3,958,088; 3,920,895; and 3,597,071. Also noted are IBM Corp. U.S. Pat. Nos. 4,651,278 and 4,623,244, and Canon U.S. Pat. No. 4,760,458 and Jap. Pub. No. 59-63872 published Nov. 4, 1984. Some of these various above patents also disclose multi-functional or integral machines [digital scanner/facsimile/printer/copiers] and their controls.

Some other network system related publications include "Xerox Office Systems Technology" ". . . Xerox 8000 Series Products: Workstations, Services, Ethernet, and Software Development" ©1982, 1984 by Xerox Corporation, OSD-R8203A, Ed. T. Linden and E. Harslem, with a "Table of Contents" citing its numerous prior publications sources, and an Abstract noting the April 1981 announcement of "the 8110 Star Informations System, A New Personal Computer . . . "; "Xerox System Integration Standard Printing Protocol XSIS 118404", April 1984; "Xerox Integrated Production Publishers Solutions: . . . " Booklet No. "610P50807" "11/85"; "Printing Protocol-Xerox System Integration Standard" ©1990 by Xerox Corporation, XNSS 119005 May 1990; "Xerox Network Systems Architecture", "General Information Manual", XNSG 068504 April 1985, with an extensive annotated bibliography, ©1985 by Xerox Corporation; "Interpress: The Source Book", Simon & Schuster, Inc., New York, New York, 1988, by Harrington, S. J. and Buckley, R. R.; Adobe Systems Incorporated "PostScript ® Language Reference Manual", Addison-Wesley Co., 1990; "Mastering Novell ® Netware ®", 1990, SYBEX, Inc., Alameda, Calif., by Cheryl E. Currid and Craig A. Gillett; "Palladium Print System" ©MIT 1984, et sec; "Athena85" "Computing in Higher Education: The Athena Experience", E. Balkovich, et al, Communications of the ACM, 28(11) lap. 1214–1224, Nov., 1985; and "Apollo87" "The Network Computing Architecture and System: An Environment for Developing Distributed Applications", T. H. Dineen, et al, Usenix Conference Proceedings, June 1987.

Noted regarding commercial network systems with printers and software therefor is the 1992 Xerox ® Corporation "Network Publisher" version of the 1990 "DocuTech ® publishing system, including the "Network Server" to customer's Novell ® 3.11 networks, supporting various different network protocols and "Ethernet"; and the Interpress Electronic Printing Standard, Version 3.0, Xerox System Integration Standard XNSS 048601 (Jan. 1986). Also, the much earlier Xerox ® Corporation "9700 Electronic printing System"; the "VP Local Laser Printing" software application package, which, together with the Xerox ® "4045" or other Laser Copier/Printer, the "6085" "Professional Computer System" using Xerox Corporation "ViewPoint" or "GlobalView" ® software and a "local printer [print service] Option" kit, comprises the "Documenter" system. The even earlier Xerox ® Corporation "8000" "Xerox Network Services Product Descriptions" further describe other earlier Xerox ® Corporation electronic document printing systems. Eastman Kodak "LionHeart ®" systems, first announced Sep. 13, 1990, are also noted. Current popular commercial published "systems software" including LAN workstation connections; includes Novell ®DOS 7.0, "Windows TM" NT 3.1, and IBM OS/2 Version 2.1.

In accordance with one aspect of a disclosed embodiment of the present invention, there is provided a method of managing a print job and producing prints, from the print job, when selected electronic information resides in a list of the memory, including: storing the print job in a first memory area, a segment of the print job being identified by an event code number; registering the event code number, electronically, in the list, so that the event code number is associated with a selected proof user and mapped to the print job segment; producing an electronic proof segment from the print job segment, the electronic proof segment being generated with a special instruction set, the special instruction set including the event code number; transmitting a representation of the electronic proof segment, along with the special instruction set, to the selected proof user, wherein, in response to receiving the special instruction set, the selected proof user provides a set of proof-related information, in electronic form, to the printing system, by reference to the event code number; the printing system then electronically updating the list entry matching the event code number, with the proof-related information, when a preselected condition is met; and in response to said electronic updating, operating a printing machine to produce one or more prints representative of the stored print job.

In accordance with another aspect of the disclosed embodiment of the present invention, there is provided a method of outputting a selected print job including: receiving, at a database, sets of proof-related information for the selected print job, each set being identified with a proof event number and including proof decision data, the proof decision data indicating whether a proof user deems a portion of the job to be in one of a first state and a second state; updating the database with the proof decision data, by reference to each proof event number, so that the database reflects whether each job portion is in the first state or the second state; assessing the respective states of the job portions; and outputting the job when it is determined, by way of said assessing, that each job portion is in the first state.

In accordance with yet another aspect of the disclosed embodiment of the present invention, there is provided a printing system for producing prints, representative of a selected print job, the printing system including an electronic job file for storing a selected print job, including: means for transmitting, to a proof user, a representation of a segment of the selected print job and a special instruction sheet, the special instruction sheet having a proof event number and instructions regarding both a manner in which the proof user is to review the selected print job segment and provide proof-related information regarding the selected print job segment; a database for receiving the proof-related information for the selected print job segment, the proof-related information for the selected print job segment being identified with the proof event number and including proof decision data, wherein the database is updated with the proof decision data, by reference to the proof event number; and a print machine for receiving an electronic copy of the selected print job, from the job file, and producing the prints, of the selected print job.

These and other aspects of the invention will become apparent from the following description, the description being used to illustrate a preferred embodiment of the invention when read in conjunction with the accompanying drawings.

Figure 1:
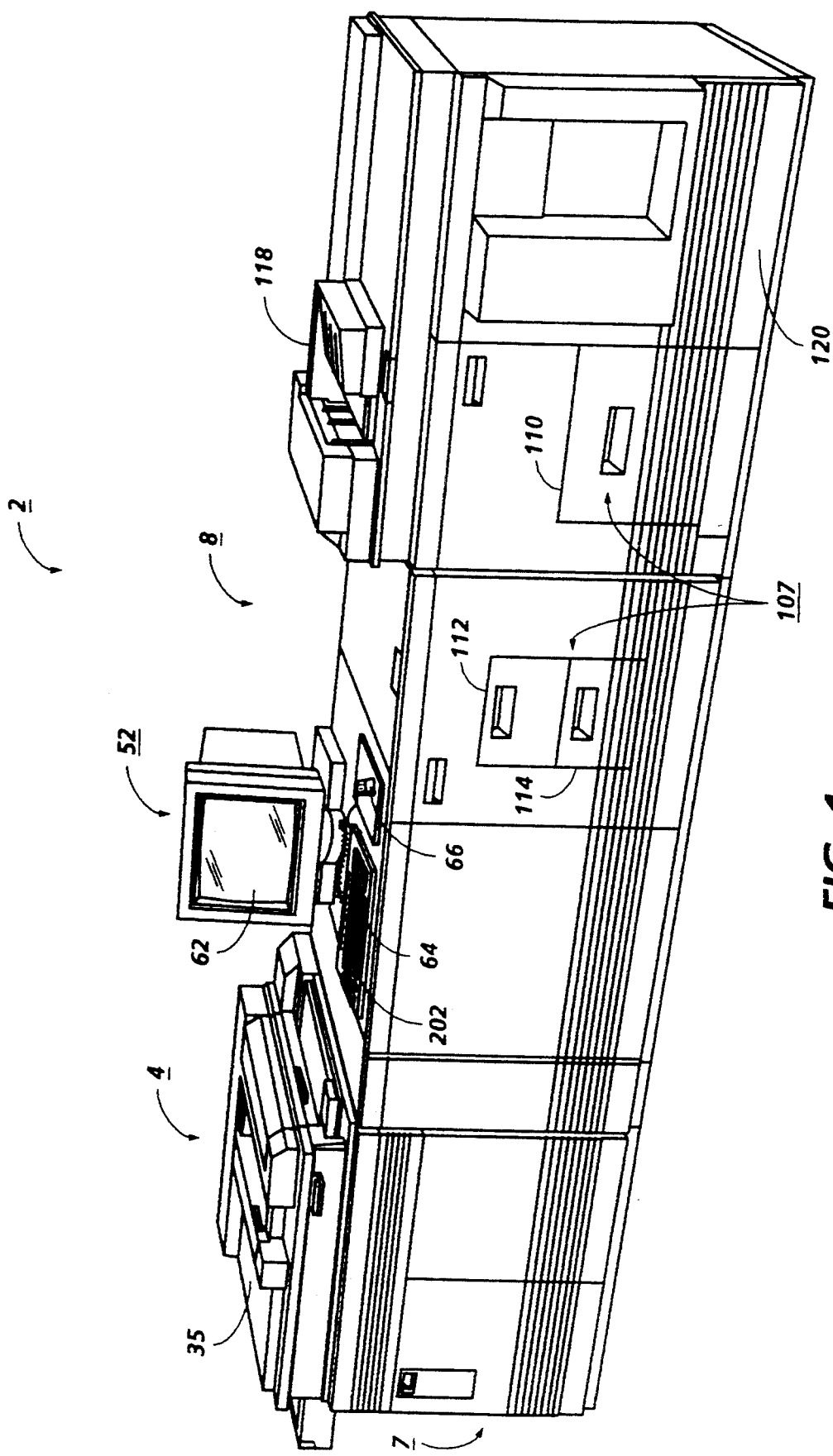
FIG. 1 is a perspective view depicting an electronic printer of the type adapted for use with a document proofing method of the present invention.
Figure 2:
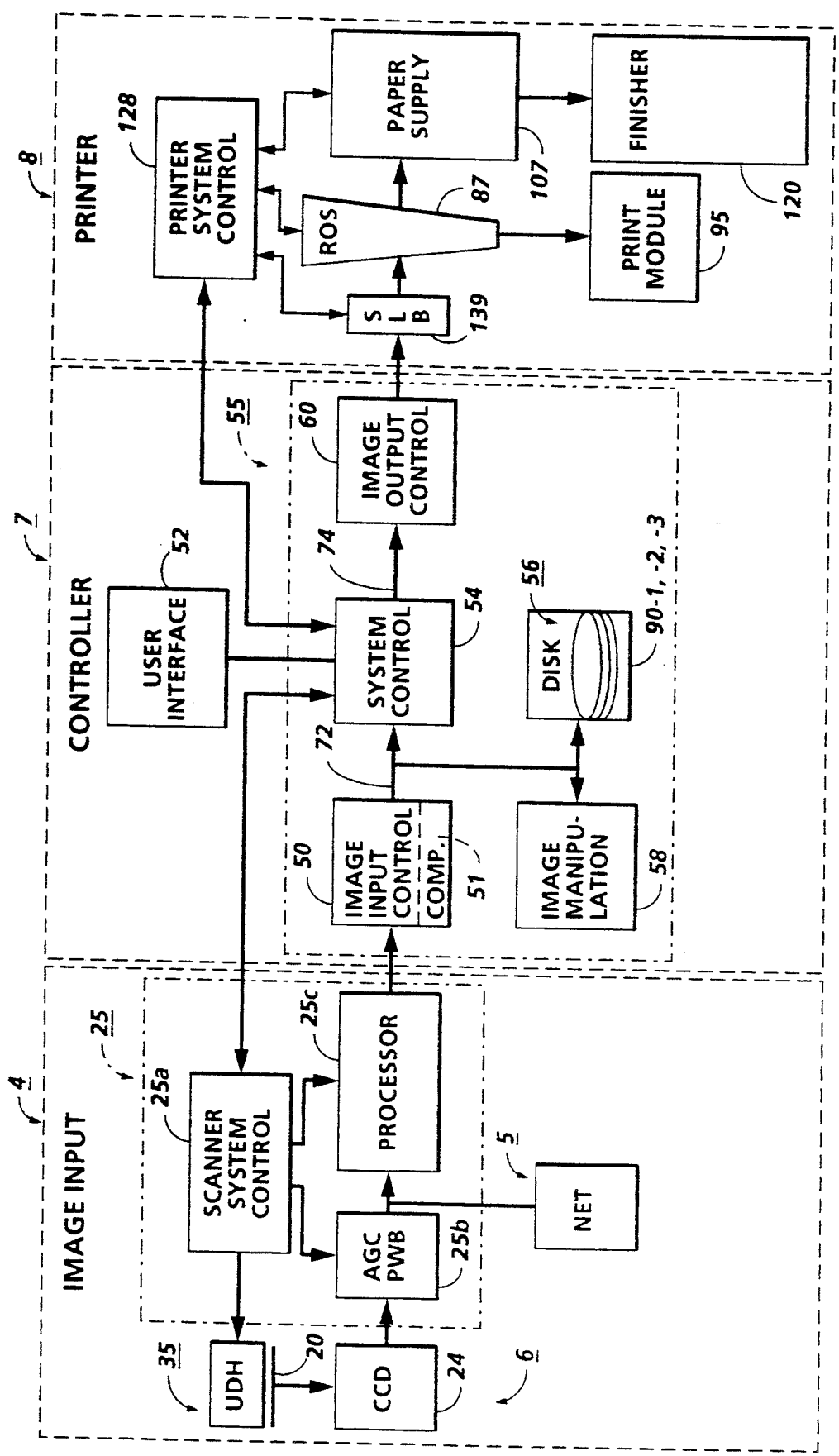
FIG. 2 is a block diagram depicting the major elements of the printer shown in FIG. 1.
Figure 3:
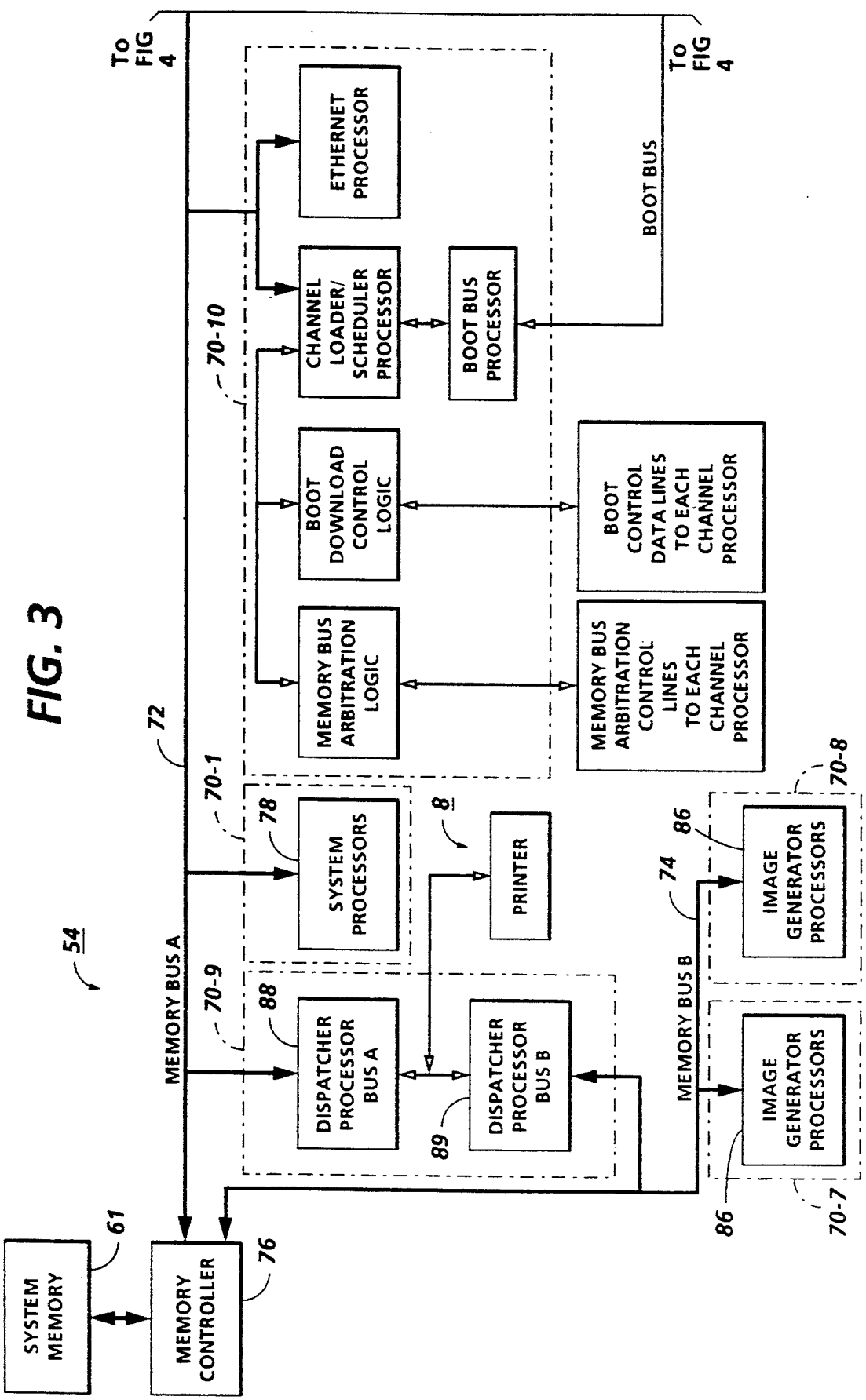
Figure 4:
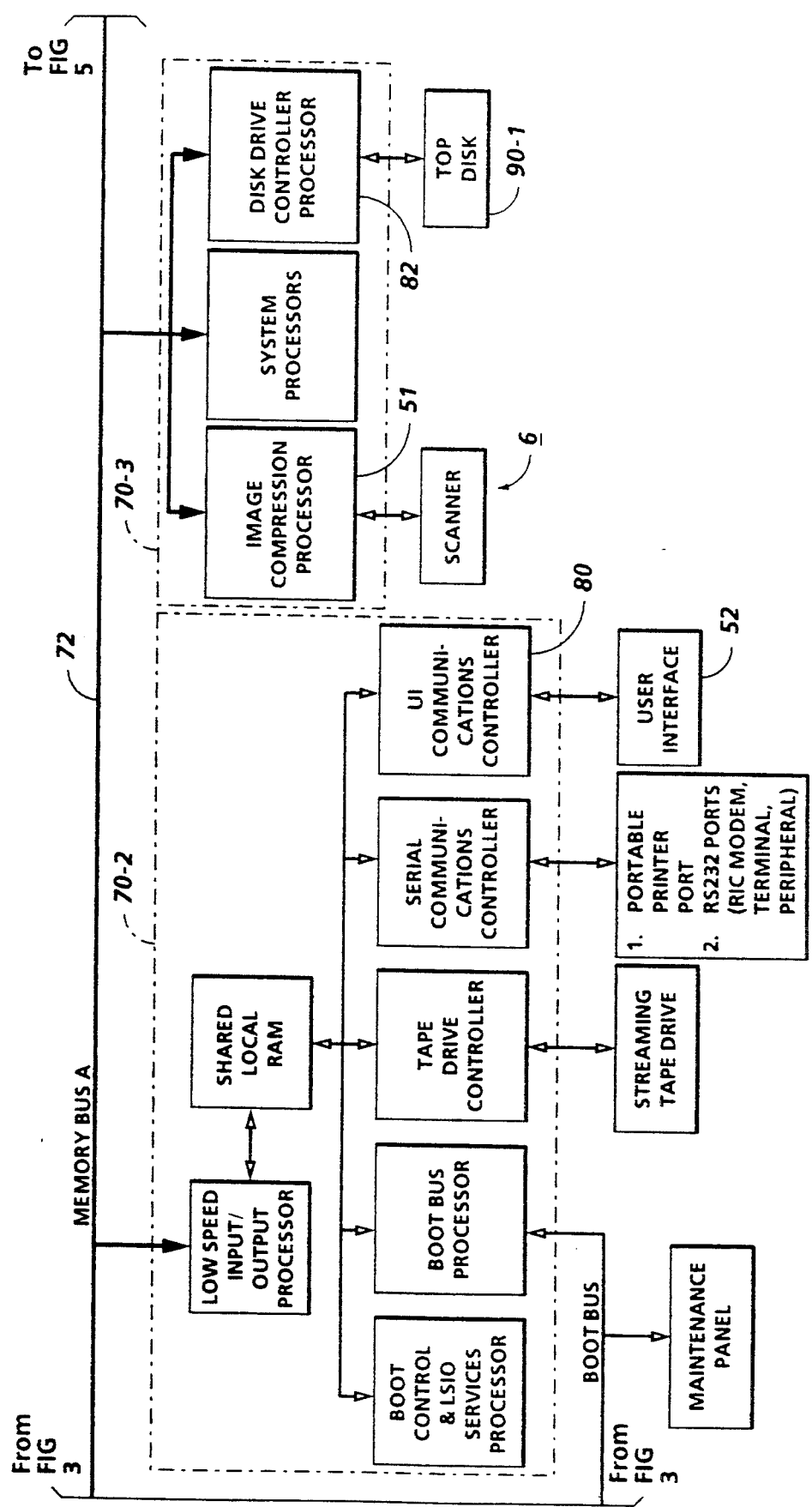
Figure 5:
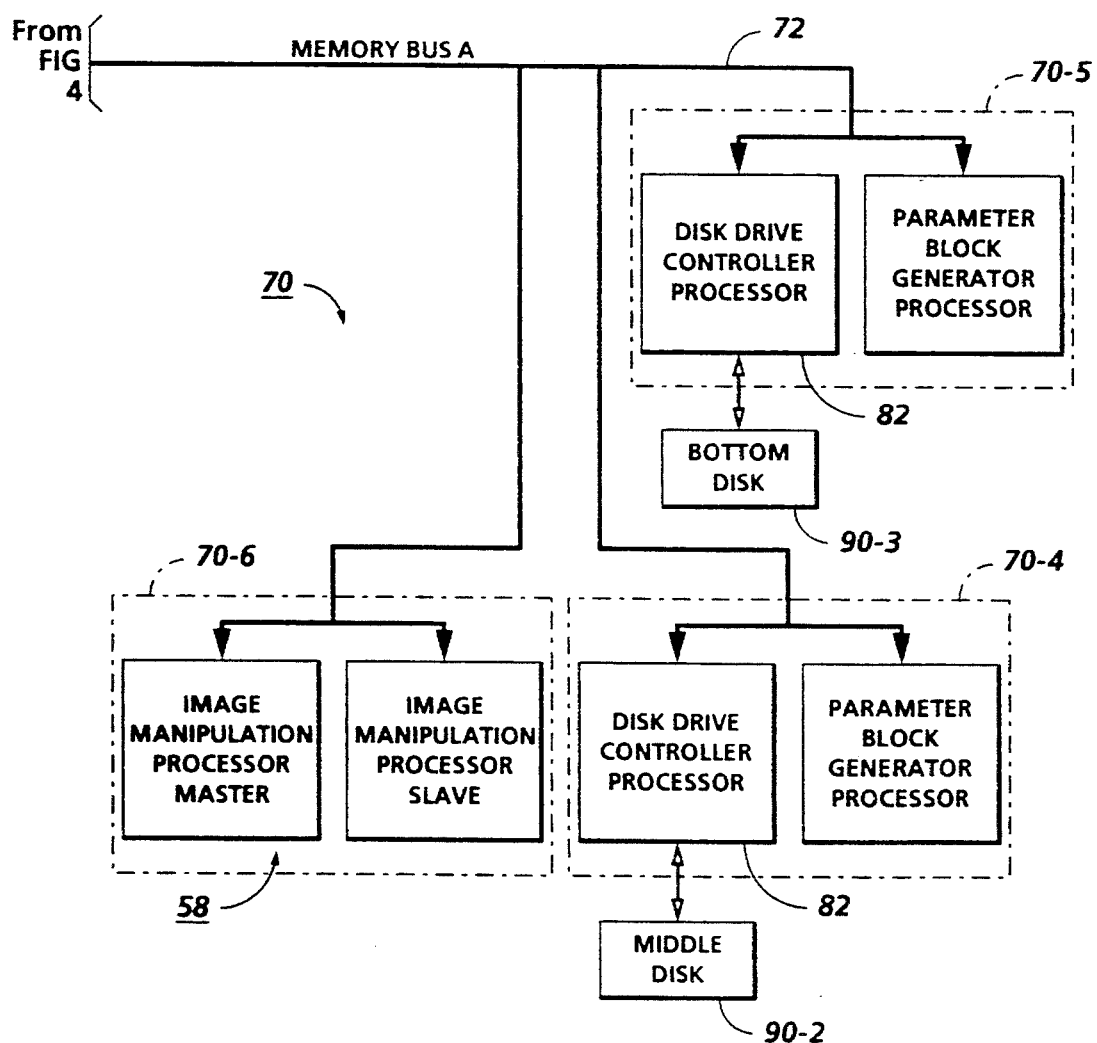
Figure 7:
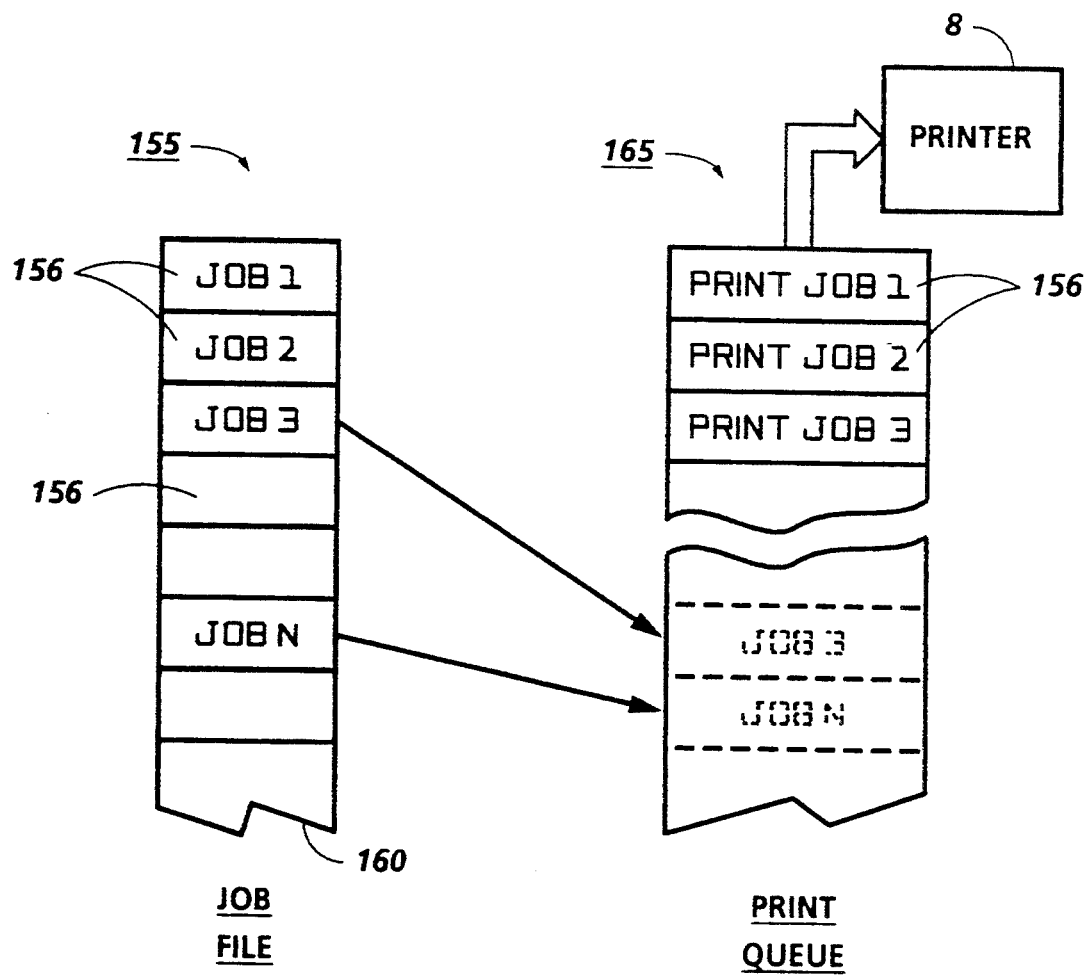
Figure 8:
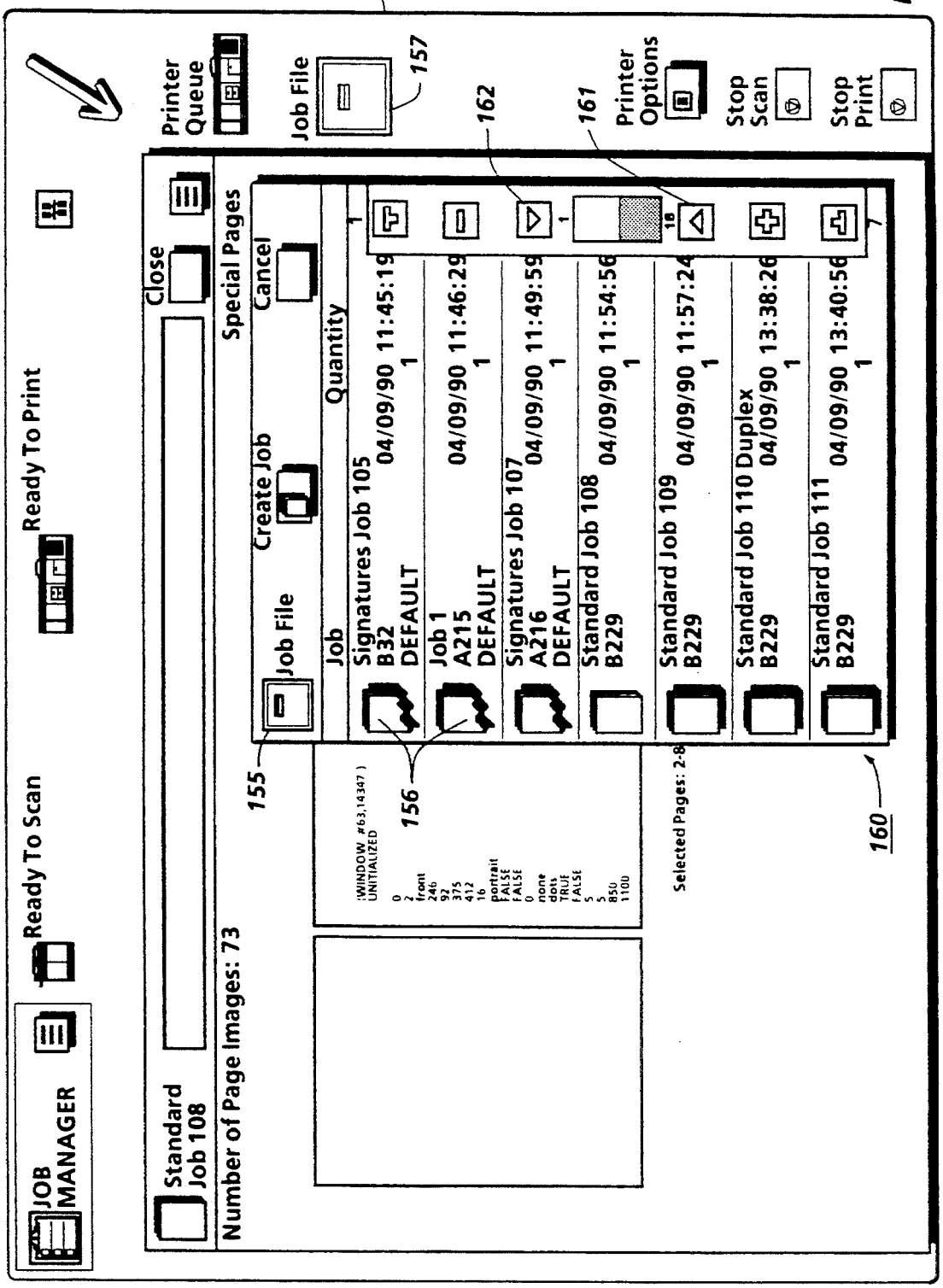
Figure 9:
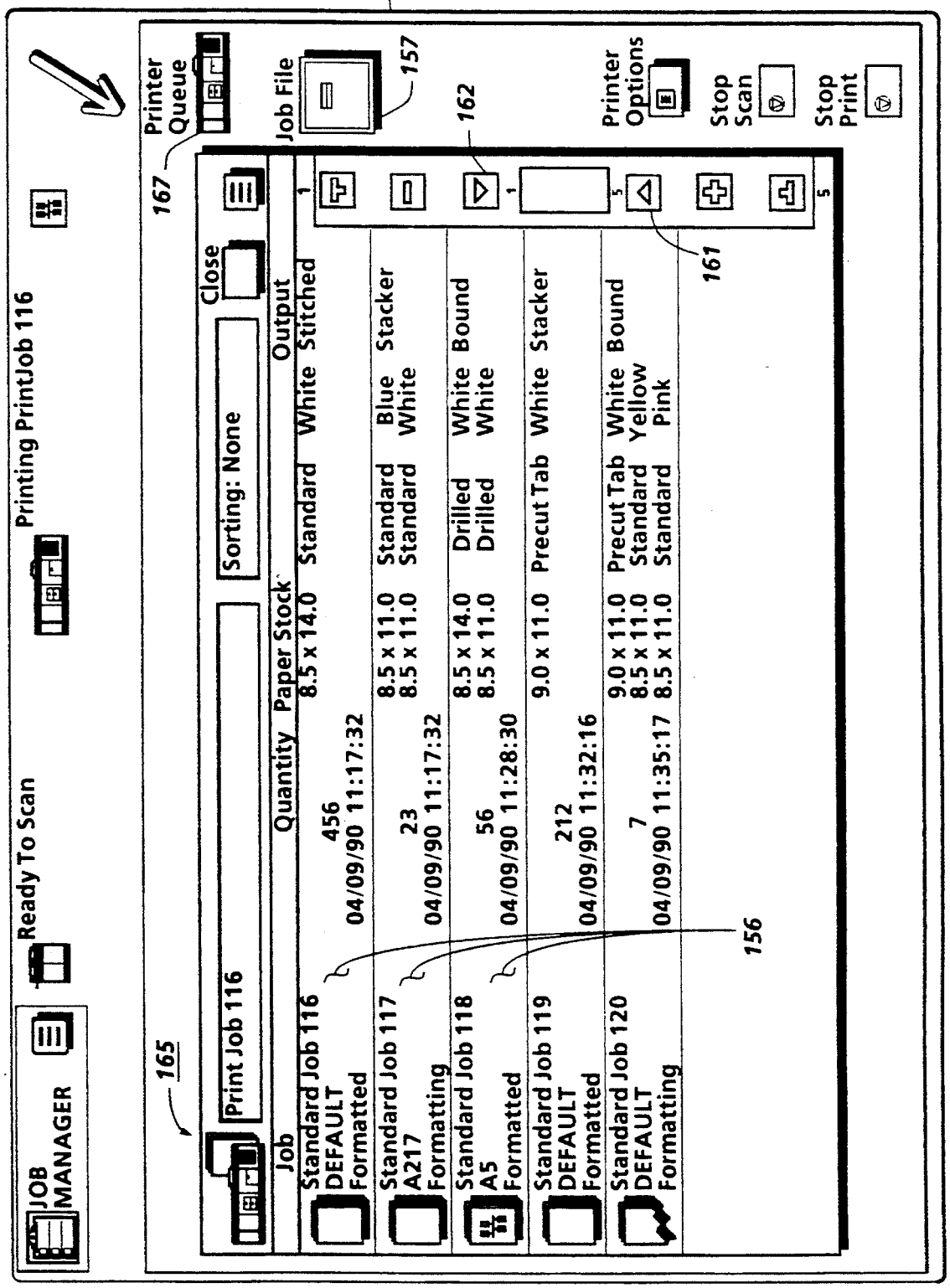
Figure 10:
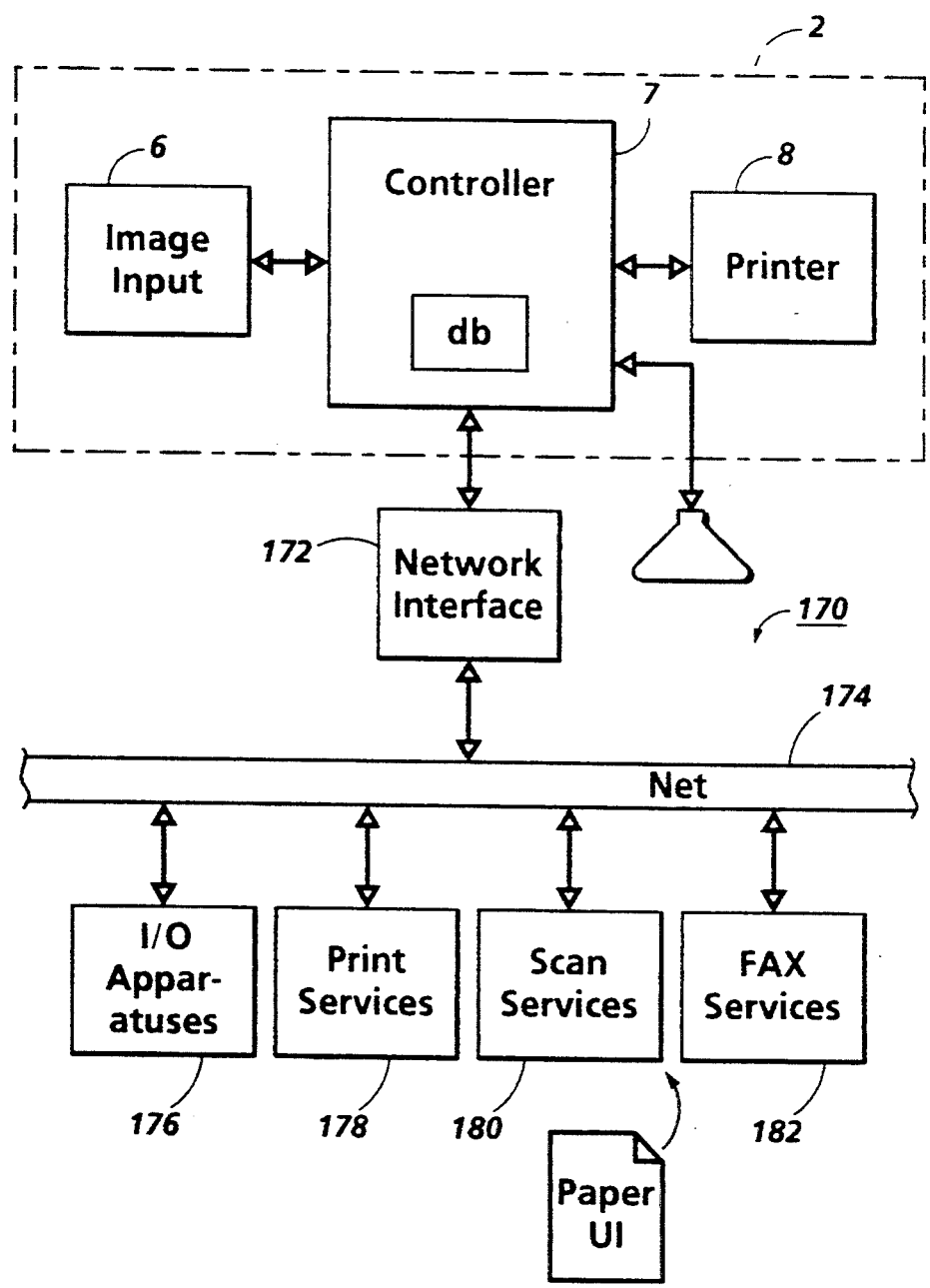

FIGS. 3-5 comprise a schematic block diagram showing the major parts of a controller for the printer shown in FIGS. 1 and 2;

Figure 6:
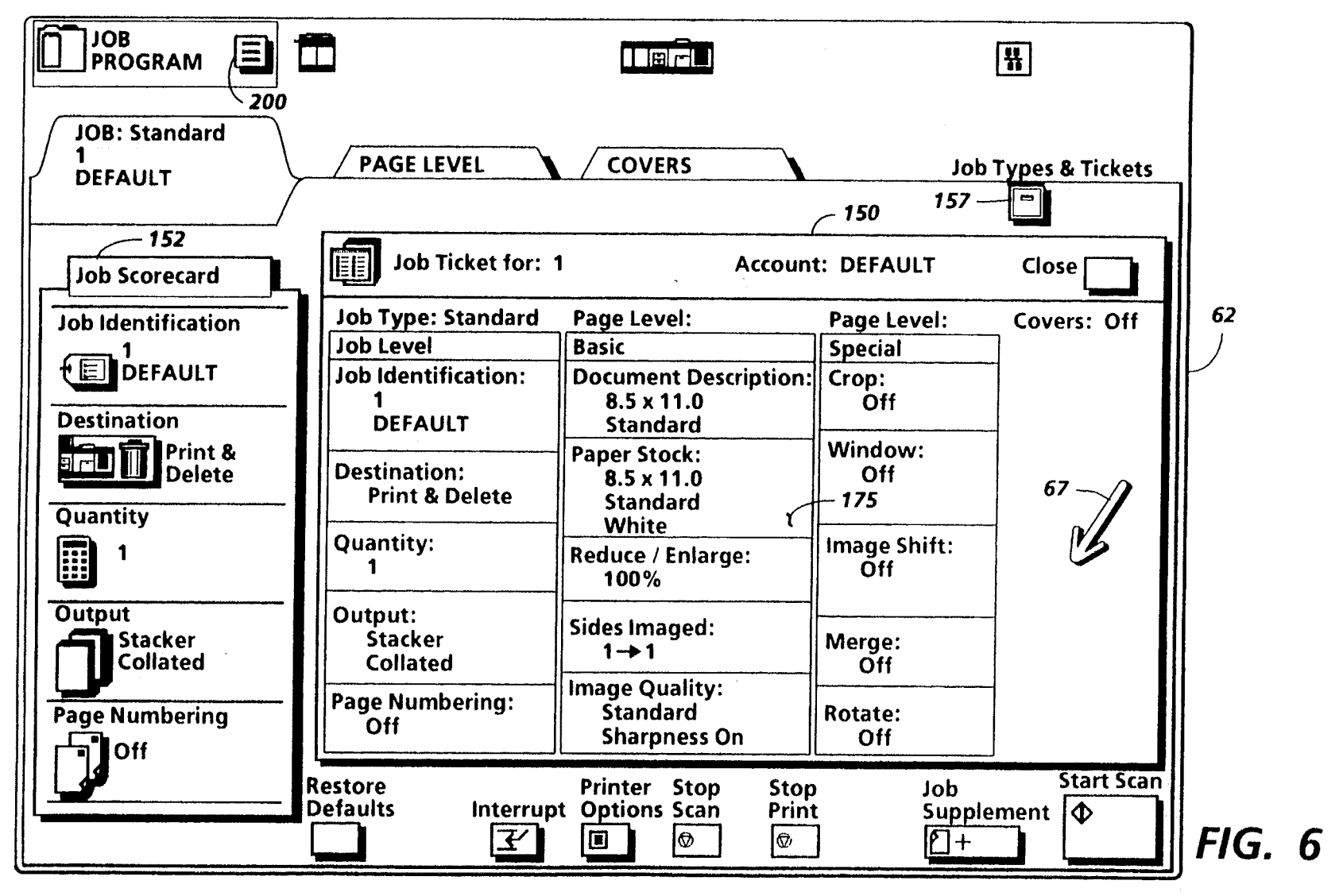

FIG. 6 is a view depicting an exemplary job programming ticket and job scorecard displayed on the User Interface (UI) touchscreen of the printer shown in FIG. 1, the job ticket and job scorecard being associated with a job to be printed;

FIG. 7 is a schematic view depicting a Job File and a Print Queue, each being associated with the controller of the printer of FIG. 1;

FIG. 8 is an elevational view of the User Interface touchscreen display depicting a Job File for storing typical jobs of the printing system;

FIG. 9 is an elevational view of the User Interface touchscreen display depicting a print queue of typical jobs to be printed;

FIG. 10 is a block diagram depicting a network printing system including the printing system of FIG. 2;

FIGS. 11-16 conjunctively represent a flow chart depicting a document proofing management method intended for use with the printing system of FIG. 10;

FIG. 17 is a schematic representation of a database stored in a mass memory section of the network printing system of FIG. 10; and FIG. 18 is a schematic representation of an instruction sheet used to facilitate the document proofing method.

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

Referring to the drawings where like reference numerals designate identical or corresponding parts throughout the several views, and more particularly to FIGS. 1 and 2, there is shown an exemplary image printing system 2 for processing print jobs in accordance with the teachings of the present invention. Printing system 2, for purposes of explanation, is divided into image input section 4, controller section 7, and printer section 8. In the example shown, the image input section 4 has both remote and on-site image inputs, enabling system 2 to provide network, scan, and print services. Other system combinations may be envisioned such as a stand alone printing system with on-site image input (i.e., a scanner), controller and printer; a network printing system with remote input, controller, and printer; etc.

While a specific printing system is shown and described, the present invention may be used with other types of printing systems. For example, printer section 8 may instead use a different printer type such as ink jet, ionographic, thermal, photographic, etc., and, furthermore, may be incorporated in electronic display systems, such as CRTs, LCDs, LEDs, etc. or else other image scanning/processing/recording systems, or else other signal transmitting/receiving, recording systems, etc. as well.

For off-site image input, image input section 4 has, in one example, a network 5 with a suitable communication channel such as an EtherNet® connection enabling image data in the form of image signals or pixels from one or more remote sources to be input to system 2 for processing. Where the Page Description Language (PDL) of the incoming imaging data is different than the PDL used by system 2, suitable conversion means (not shown) are provided. Other remote sources of image data such as streaming tape, floppy disk, video camera, etc. may be envisioned.

For on-site image input, section 4 has a document scanner section 6 with a Universal Document Handler (UDH) 35 for the purpose of automatically and sequentially placing and locating sets of multiple documents for scanning. Scanner section 6 incorporates one or more linear light sensitive arrays 24 for reciprocating scanning movement below platen 20 and focused on a line-like segment of platen 20 and the document being scanned thereon. Array 24, which may utilize Charge-Coupled Device (CCD) technology or the like, provides image elemental signals or pixels representative of the image scanned which are input to processor 25 for processing.

Processor 25 communicates with the controller section 7 and includes a scanner system control 25a, an automatic gain control printing wiring board (AGCPWB) 25b, and a processor 25c. AGCPWB 25b converts the analog image signals output by array 24 to digitally represented facsimile signals and processor 25c processes the digital image signals as required to enable controller section 7 to store and handle the image in the form and order required to carry out the job programmed. After processing, the image signals are output to controller section 7. Image signals derived from net 5 are similarly input to processor 25c.

Processor 25c also provides enhancements and changes to the image signals such as filtering, thresholding, screening, cropping, scaling (reduction/enlargement), etc. Following any changes and adjustments in the job program which affect these image processing parameters, the document must be rescanned to capture the specified modification.

Printer section 8 comprises a laser type printer having a Raster Output Scanner (ROS) 87, Print Module 95, Paper Supply 107, Finisher 120, and Printer System Control 128. ROS 87 has a two beam laser with the beams modulated in accordance with the content of an image signal input by acousto-optic modulator to provide dual imaging beams which are scanned across a moving photoreceptor of Print Module 95 by means of a rotating polygon. This exposes two image lines on the photoreceptor with each scan to create the latent electrostatic images represented by the image signal input to the modulator.

The latent electrostatic images are developed and transferred to a print media delivered by paper supply 107. As will be appreciated by those skilled in the art, print media can comprise a selected one of various known substrates which are capable of accepting an image, such substrates including transparencies, preprinted sheets, vellum, glossy covered stock, film or the like. The print media may comprise any of a variety of sheet sizes, types, and colors, and for this, plural media supply trays 110, 112, 114 (FIG. 1) are provided. The transferred image is permanently fixed or fused and the resulting prints discharged to either output tray 118 (FIG. 1), or to finisher 120. Finisher 120 provides certain finishing selections such as a stitcher for stitching or stapling the prints together to form books, a thermal binder for adhesively binding the prints into books, and/or other finishing options such as slitting, perforating, saddle stitching, folding, trimming, or the like.

Printer system control 128 (FIG. 2) automatically and precisely controls all the printer functions and operations in accordance with job program parameters received from system control 54 of controller section 7, as well as from internally derived signals from sensors and processes within the printer section 8. Printer system control signals are derived and distributed via a plurality of printed wiring boards (PWBs) in a multiprocessor architecture characterized by multiple microprocessor controller cores, serially interconnected, and also serially linked to more numerous input/output processing circuit PWBs. Controller section 7 is, for explanation purposes, divided into an image input control 50, User Interface (UI) 52, system control 54, main memory 56, image manipulation section 58, and image output control 60. The units 50, 54, 56, 58, 60 comprise a system which may also generally be referred to as the "Electronic Subsystem" (ESS).

The scanned image data input from processor 25c of scanner section 6 to controller section 7 is compressed by image compressor/processor 51 of image input control 50 and placed in an image file. Image files, which represent different print jobs, are temporarily stored in system memory 61 (seen in FIG. 3A) pending transfer to main memory 56 where the data is held pending use.

Referring again to FIG. 1, UI 52 includes a combined operator controller/CRT display consisting of an interactive touchscreen 62, keyboard 64, and mouse 66. UI 52 interfaces the operator with printing system 2, enabling the operator to program print jobs and other instructions, and to obtain system operating information, visual document facsimile display, programming information and icons, diagnostic information and pictorial views, etc. Items displayed on touchscreen 62 such as files and icons are actuated by either touching the displayed item on screen 62 with a finger, or by using mouse 66 to point cursor 67 (seen in FIG. 4) to the item selected and keying the mouse.

Main memory 56 (FIG. 2) has plural hard disks 90-1, 90-2, 90-3 for storing machine Operating System software, machine operating data, and the scanned image data currently being processed. When the compressed image data in main memory 56 requires further processing, or is required for display on touchscreen 62 of UI 52, or is required by printer section 8, the data is accessed in main memory 56. Where further processing other than that provided by processor 25 is required, the data is transferred to image manipulation section 58 where the additional processing steps such as collation, make ready (document editing), decomposition, rotation, etc., are carried out. Following processing, the data may be returned to main memory 56, sent to UI 52 for display on touchscreen 62, or sent to image output control 60.

Referring particularly to FIGS. 3–5, image data output to image output control 60 is decorepressed and readied for printing by image generating processors 86 of PWBs 70-7, 70-8. Following this, the data is output by dispatch processors 88, 89 on PWB 70-9 via Scan Line Buffer (SI B) 139 (FIG. 2) to printer section 8. Image data sent to printer section 8 for printing is normally purged from memory 56 to make room for new image data.

Control section 7 includes a plurality of Printed Wiring Boards (PWBs) 70 (FIGS. 3–5), PWBs 70 being coupled with one another and with System Memory 61 by a pair of memory buses 72, 74. A memory controller 76 couples System Memory 61 with buses 72, 74. PWBs 70 include system processor PWB 70-1 having plural system processors 78; low speed I/O processor PWB 70-2 having UI communication controller 80 for transmitting data to and from UI 52; PWBs 70-3, 70-4, 70-5 having disk drive controller/processor 82 for transmitting data to and from disks 90-1, 90-2, 90-3 respectively of main memory 56 (image compressor/processor 51 for compressing the image data is on PW8 70-3); image manipulation PWB 70-6 with image manipulation processors of image manipulation section 58; image generation processor PWBs 70-7, 70-8 with image generation processors 86 for processing the image data for printing by printer section 8; dispatch processor PWB 70-9 having dispatch processors 88, 89 for controlling transmission of data to and from printer section 8; and boot control-arbitration-scheduler PWB 70-10.

Referring to FIG. 6, jobs are programmed in a Job Program mode in which there is displayed on touchscreen 62 a Job Ticket 150 and a Job Scorecard 152 for the job being programmed. Job Ticket 150 displays various job selections available for programming, while Job Scorecard 152 displays the basic instructions to the system for printing the job. Various Job Ticket types are provided, with access by means of Job Types and Tickets icon 157.

Job Tickets 150 have three programming levels, referred to as "Job Level", "Basic", and "Special", each having a series of icons for accessing the various programming selections available at that level. Each programming level has a Scorecard 152 associated with it so that on activation of a particular job level or of a specific icon, the appropriate Scorecard is displayed on touchscreen 62.

As described, print jobs may be derived from multiple sources, i.e., jobs scanned in using scanner 6 for printing; jobs scanned in, stored, and then edited or added to for printing later; jobs remotely scanned in and submitted to the system as, for example, through net 5 (FIG. 2); jobs remotely developed and then submitted to the system for printing, etc.

Referring to FIGS. 7 and 8, the image files are arranged in a job file 155, with the print jobs 156 numbered consecutively in the order in which the print jobs are scanned in or labeled as a system operator or network user may specify. Where the operator wishes to see the jobs currently residing in job file 155, as for example, to select jobs to be moved to the print queue for printing, a SYSTEM FILE icon 157 on touchscreen 62 is actuated. This displays a list 160 of the jobs 156 currently in the job file on screen 62, an example of which is shown in FIG. 8. Each job is identified by a descriptor showing the type of job, job number, number of prints, etc. By using up and down scrolling icons 161,162, the operator can scroll the list of jobs where the number of jobs in the job file is too large to be simultaneously displayed on touchscreen 62.

Referring also to FIG. 9, to print a job 156, the job is copied into a print queue 165. A PRINTER QUEUE icon 167 on touchscreen 62, when actuated, displays the current print queue with a list of the jobs in the queue on touchscreen 62. Each job in print queue 165 has a displayed job descriptor identifying the job, job number, quantity to be printed, paper color, finishing type, etc. Print queue 165 is ordered by priority and time of arrival of the job in the print queue. Other priority orderings may be envisioned.

Referring to FIG. 10, the controller is coupled with network arrangement 170 by way of a network interface 172. The network interface 172 includes all of the hardware and software necessary to relate the hardware/software components of the controller 7 with the hardware/software components of the network arrangement 170. For instance, to interface various protocols between the server and the network arrangement, the network interface could be provided with, among other software, Netware ® from Novell Corp.

To facilitate communication from both telecommunications and Facsimile ("FAX") sources, the network interface is preferably provided with dedicated hardware from New Voice Inc., designated by the serial number "NV800". The NV800, which includes a dedicated processor, serving to implement a modem capability, is a multiplexing type device, i.e. a PBX adapted device, for facilitating the linking of multiple (e.g. 8) FAX/voice based lines to the controller 7. More particularly, the NV800 permits multiple users to access and use the controller 7 in a multiplexed fashion. Preferably, the New Voice system is used in conjunction with dedicated software referred to as "DAX" and manufactured by Ram Research. Additionally, as will appear from a discussion, it is desirable to provide the controller with the capability to record messages, via telephone or FAX, and store those messages on disk. This can be achieved readily through use of suitable hardware and software, such as the NV800 and DAX. A playback system, part of which includes a speaker 173, is preferably provided at the controller so that recorded messages can be accessed and listened to by an operator of the printing system 2. A playback system suitable for this use is produced by Sun Microsystems, Inc.

In the network arrangement 170, various I/O and storage devices are interconnected with a bus 174. In particular, the devices include, among others the following: I/O Apparatuses 176, Print Services 178, Scan Services 180 and FAX Services 182. In the present example a given I/O Apparatus may include a telephone and/or a workstation, such as any suitable PC compatible apparatus. In one example, the telephone, PC and FAX capability is provided by an integrated digital apparatus, such as that manufactured by Canon Corp. under the series name of "Navigator HD40". While in this example, the telephone is digitally based so that no interface, such as a modem, is required, in other examples the telephone could employ a suitable telecommunications interface without affecting the concept underlying the currently disclosed embodiment.

In one embodiment, the printing system 2 is a DocuTech ® Network Printing System ("Network Printer") which prints jobs transmitted from one of the I/O apparatuses 176, such as a Xerox ®6085 workstation. In one embodiment, the Network Printer processes network jobs written in a page description language ("PDL") known as "Interpress" and as a prerequisite, to printing the network job, the Network Printer decomposes the job from a high level primitive form to a lower level primitive form. The decomposition process is discussed in further detail in U.S. application Ser. No. 07/898,761 entitled "Apparatus and Method for Multi-Stage/Multi-Process Decomposing", filed on Jun. 12, 1992, by Bonk et al., the pertinent portions of which are incorporated herein by reference. In another embodiment the Network Printer is used, in conjunction with a DocuTech ® Network Server, see Print Services 178, to print jobs written in, among other PDLs, Postscript ®. The structure and operation of the DocuTech ® Network Server may be more fully comprehended by reference to U.S. Pat. No. 5,226,112 to Mensing et al., the pertinent portions of which are incorporated herein by reference. Decomposed jobs are commonly stored, for output, in the job file 155 (FIG. 8) of the Network Printer and later transferred to the print queue 165 (FIG. 9) for printing.

Preferably, the Scan Service 180 includes a workstation and a scanner, provided in the form of a package. This sort of package is made available by Xerox Corporation in the form of a WG40 scanner coupled with a 6085 workstation. It will be appreciated that the Scan Service is preferably provided with Optical Character Recognition ("OCR") capability so that the user of the controller 7 can scan hard-copy, such as a sheet referred to as "Paper UI", for use by the controller 7. As is known, the Paper UI can be used to provide a controller with appropriate directives for a job, such as printing and/or finishing instructions. An example of Paper UI, and its application can be obtained by reference to U.S. Pat. No. 5,051,779 to Hikawa, the pertinent portions of which are incorporated herein by reference. Finally, the FAX Service 182 assumes the form of any suitable networked FAX device, such as the LAN FAX Service manufactured by Xerox Corporation under the 7032 series. Details regarding the coupling of a FAX component with a printing system can be found in U.S. Pat. No. 4,821,107 to Naito et al., the pertinent portions of which are incorporated herein by reference.

Referring to FIGS. 11–16, a method of proofing a document, in which the electronic printing system 2 serves, to a great extent, as the manager of the proofing, is discussed. As an overview, in the routine of FIGS. 11 and 12, proof segments are generated and transmitted to various individuals who serve as "proofers" or "proof users". In the routines of FIGS. 13–16, feedback from the users is processed and, when one or more preselected conditions are met, the document is released for printing.

Figure 11:
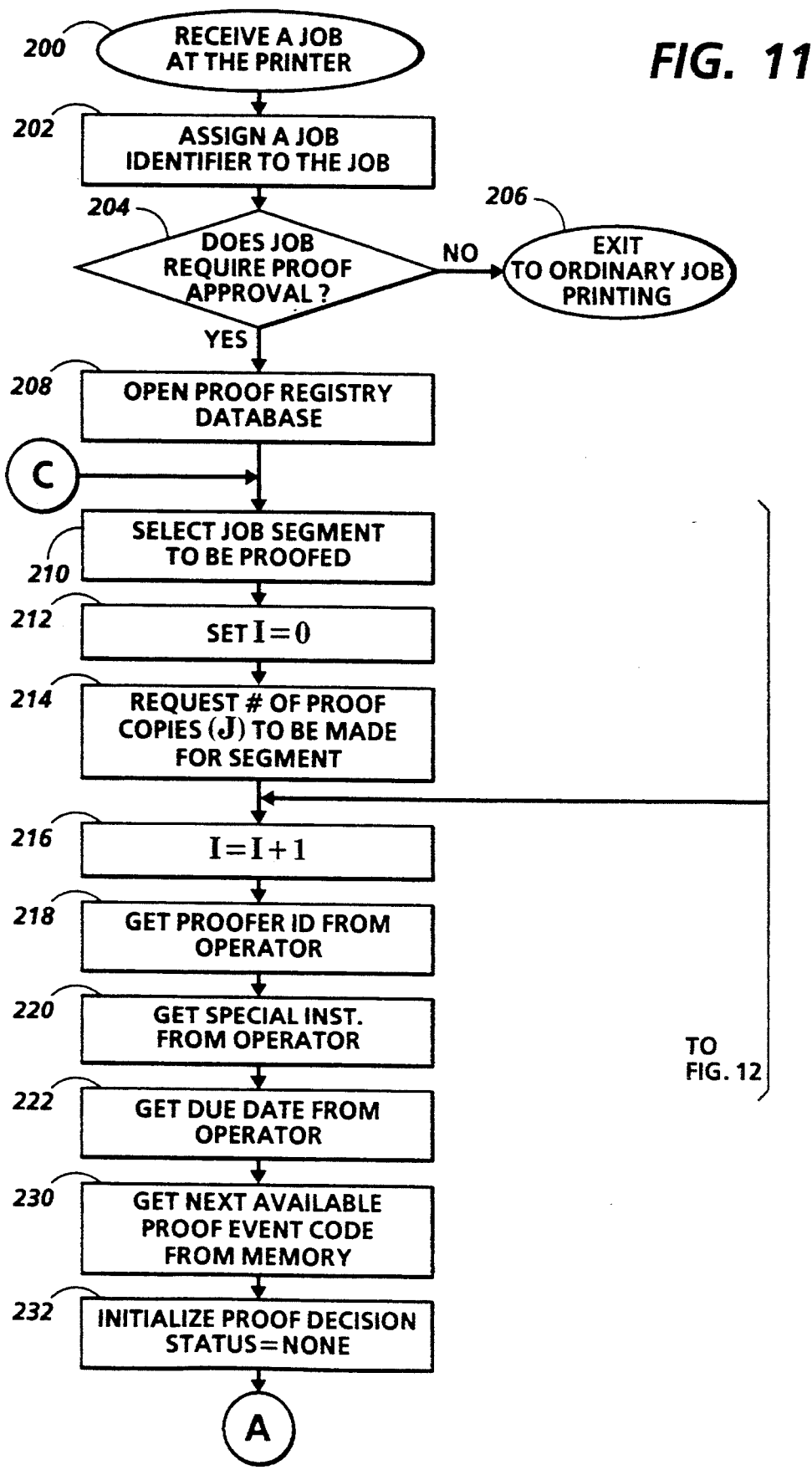

Referring first to FIG. 11, the document or job is received at the printing system by way of the input section 6 (FIG. 10) or the network. As the job is received (step 200), it is assigned a job identifier (step 202). If the job does not require proof approval (step 204) then the job is, via step 206, processed with ordinary job printing, otherwise, the process proceeds to steps 208 and 210 where a proof registry database is opened and a segment is selected for proofing. As will appear, multiple copies of several different segments can be generated by the routine of FIG. 11. An indexing approach is preferably employed in which I is set at 0 (step 212) and a value, namely J, representing the number of proof copies, to be made for a given segment, is designated at step 214. It will be appreciated that J can assume the form of a function J(x) where x is associated with a set of values with each value being mapped to one or more segments to be generated. The value of I is incremented at step 216 and various types of information, e.g. "Proofer ID", "Special Instructions", and "Due Date" are obtained from a system operator, at steps 218, 220 and 222, for insertion into the data base.

To more fully understand the significance of steps 218, 220 and 222, reference is made to a database representation in FIG. 17. In particular, each proofer or proof user is assigned one of the lines or entries 224 in the database and that line is identified uniquely with a proof event code. Additionally, the name, location and telephone number, corresponding to the line, are preferably entered under the proofer identification section. Other data (proof event data), such as job id, due date, special instructions, etc. are further added to provide a complete description of the segment being generated. Finally, it should be understood that a job can be segmented to facilitate proofing. For example, the resulting segments may correspond to the chapters of a book intended to be proofed. An identifier, namely a segment identifier, is assigned to an entry where appropriate. In the illustrated embodiment of FIG. 17, the first two lines are part of a first segment of a given job ("Job-01") and the second two lines are part of a second segment. Accordingly, for Job-01 the value of J for each of segment 1 and segment 2 would be 2.

Referring again to FIG. 11, to generate an entry 224, at step 230, a next available proof event code is obtained from memory. In the example of FIG. 17, to further develop Job-97, a proof event code of 068 would be obtained. Additionally, at step 232, the proof decision category of the entry being generated is initialized to a status of "NONE". As will appear, with respect to the discussion of FIGS. 14 and 15, this status may change as proof decision data is received from a proofer.

Figure 12:
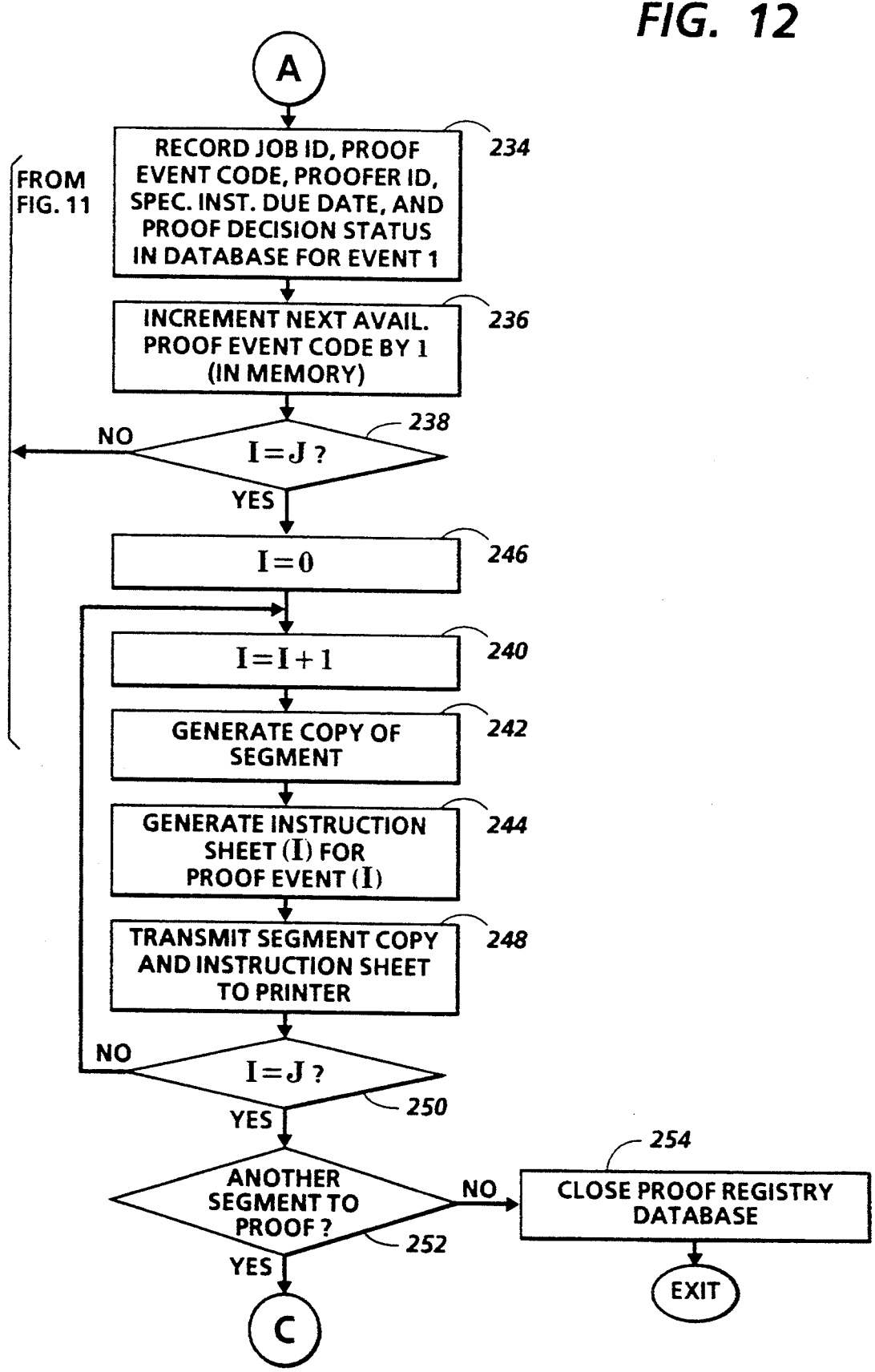

Referring to FIG. 12, at step 234, all of the information necessary to develop the entry being generated is recorded in the proof registry database. To make a proof event code available for the next entry to be generated, at step 236, the value of the next available proof event code available in memory is incremented by 1. For the example of FIG. 17, the proof event code available in memory, subsequent to generating an entry for proof event code 068, would be proof event code 069.

Referring still to FIG. 12, it is determined, at step 238 whether all of the proof-related data for each of the copies of a given segment have been generated. Referring also to the example of FIG. 17, for segment 1, steps 216 through 236 would, initially be performed twice for generating the first two lines. After generating a suitable number of lines for a given segment, a proof set is generated via steps 240, 242 and 244. Prior to executing these steps, at step 246, the index I is initialized at 0. At step 242, a first copy, of the selected job segment is generated and, pursuant to step 244, an instruction sheet (FIG. 18) is produced for each generated segment copy. Essentially, the instruction sheet provides a given proofer with a directive regarding the generated segment copy, e.g. "Please read the attached document . . ." as well as information, such as a Proof Event Code, that permits the proofer to access the database in mass memory section 56 (FIGS. 10 and 17). As each set is generated, it is, via step 248, transmitted to the printer for later conveyance to one of J proof users.

Additionally, conveyance of a segment copy can be achieved by, among other means, sending an electronic representation of the selected segment over the network, to one of the devices on Net 174 (FIG. 10), or producing a print set of the segment copy and mailing it to a proofer. When I obtains the value of J (step 250), a check is performed, at step 252, to determine if another segment is to be proofed. If another segment is to be proofed, then the process proceeds to step 210 where another job segment, for proofing, is selected, otherwise, at step 252, the proof registry database is closed.

Figure 13:
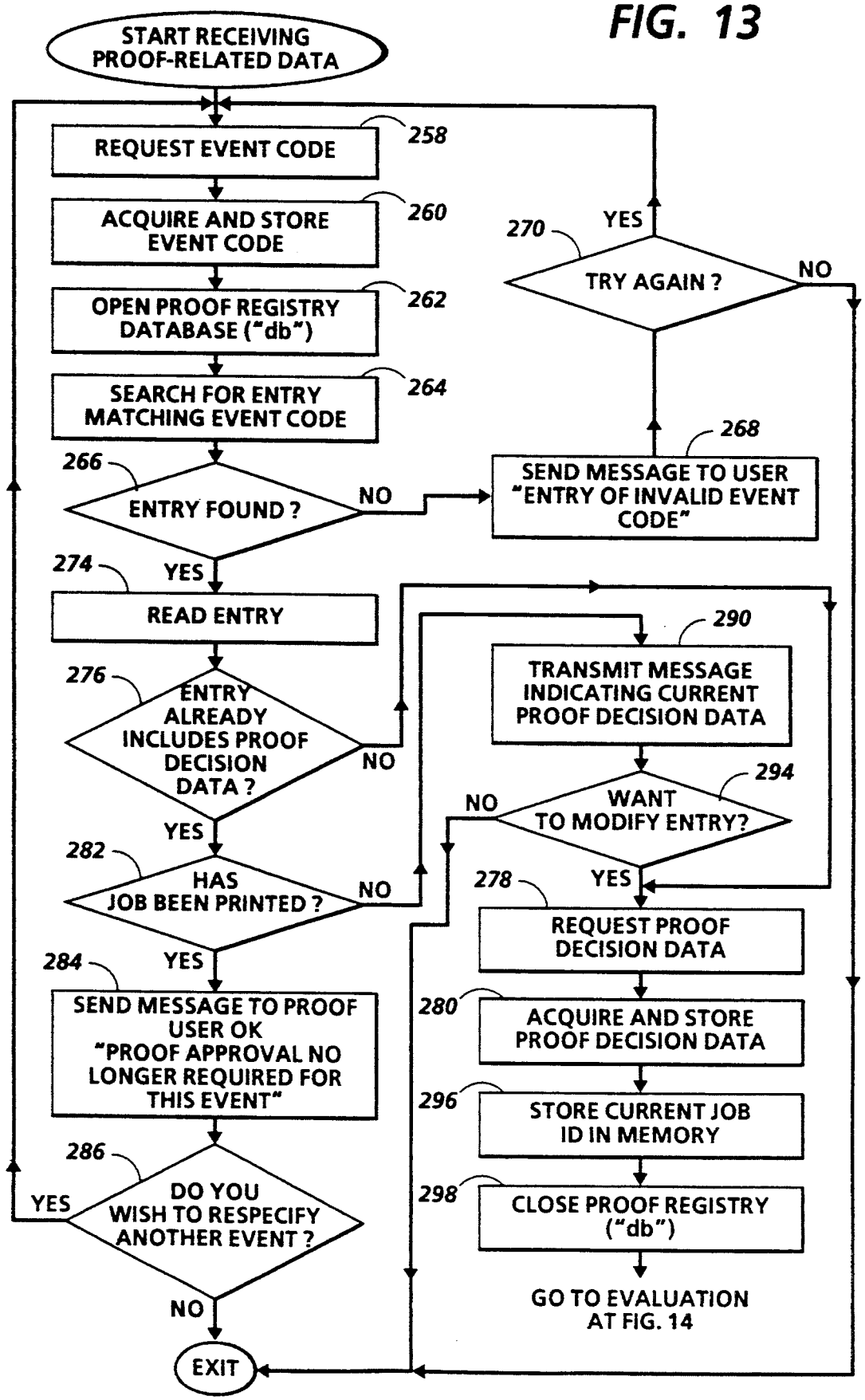

Referring to FIG. 13, after a proofer has reviewed a given job segment, s/he transmits information to the printing system database by a suitable medium. In the present description it will be assumed that the proofer and the controller 7 communicate by way of a telecommunications arrangement, but, as will be understood, other communication arrangements could be employed without affecting the concept upon which the presently disclosed embodiment is based. Initially, the printing system, through use of appropriate software, such as the above-mentioned DAX, requests that the proofer enter his/her Proof Event Code (step 258) through the use of appropriate telephone keys. Once the controller acquires an,d stores the Event Code (step 260), the proof registry database is, via step 262, opened. The process then searches for the entry (step 264) or line that matches the Event Code supplied by way of step 260.

If the entry corresponding to the supplied Event Code is not found (i.e. the answer to step 266 is negative), then a message, at step 268, is sent to the proof user indicating that an invalid Event Code has been entered and the user is, via step 270, given the opportunity to "TRY AGAIN". If they choose not to try again, the process is exited. If they do wish to try again, then the process is repeated from step 258. If, on the other hand, the entry is found at step 266, then the line corresponding to the entry is read (step 274). As will appear, the process insures that a proofer associated with a given event code is empowered to provide proof decision data, e.g. data indicating an approval or disapproval of a segment, provided a job corresponding with the proof decision data has not already been printed. Accordingly, at step 276, the process determines if proof decision data has already been received in the database entry corresponding with the entry read.

For those situations in which proof decision data has not been received previously, the process proceeds to steps 278 and 280 where the controller obtains the proof decision data and stores the same. If, on the other hand, proof decision data has been obtained previously, then a check is made, at step 282, to determine if the corresponding job has been printed. For a printed job, the proofer is provided, via step 284, with a message indicating "PROOF APPROVAL NO LONGER REQUIRED FOR THIS EVENT". In response to sending the message of step 284, the user is given another opportunity, at step 286, to specify another event. If the user wishes to specify another event because, for example, s/he mistyped the event code, initially, the process loops back to step 258, for requesting an event code, otherwise, the process exits from all further activity. During the exit step, preferably, the proof registry database is closed.

For a job which has not been printed (see step 282), the proofer is informed, via step 290, that proof decision data has already been recorded at an entry corresponding to that of the proofer's Event Code. At step 294, the proofer is asked whether s/he desires to modify the current proof decision data at that entry. If modification is not desired, the process exits from alII further activity, otherwise, the incoming proof decision data is obtained and stored by way of steps 278 and 280. During the exit step, preferably, the proof registry database is closed. In addition to steps 278 and 280, the current job identifier is stored, at step 296, and, at step 298, the proof registry database is closed. As a result of performing step 298, the process goes to the evaluation routine of FIGS. 14 and 15.

Figure 14:
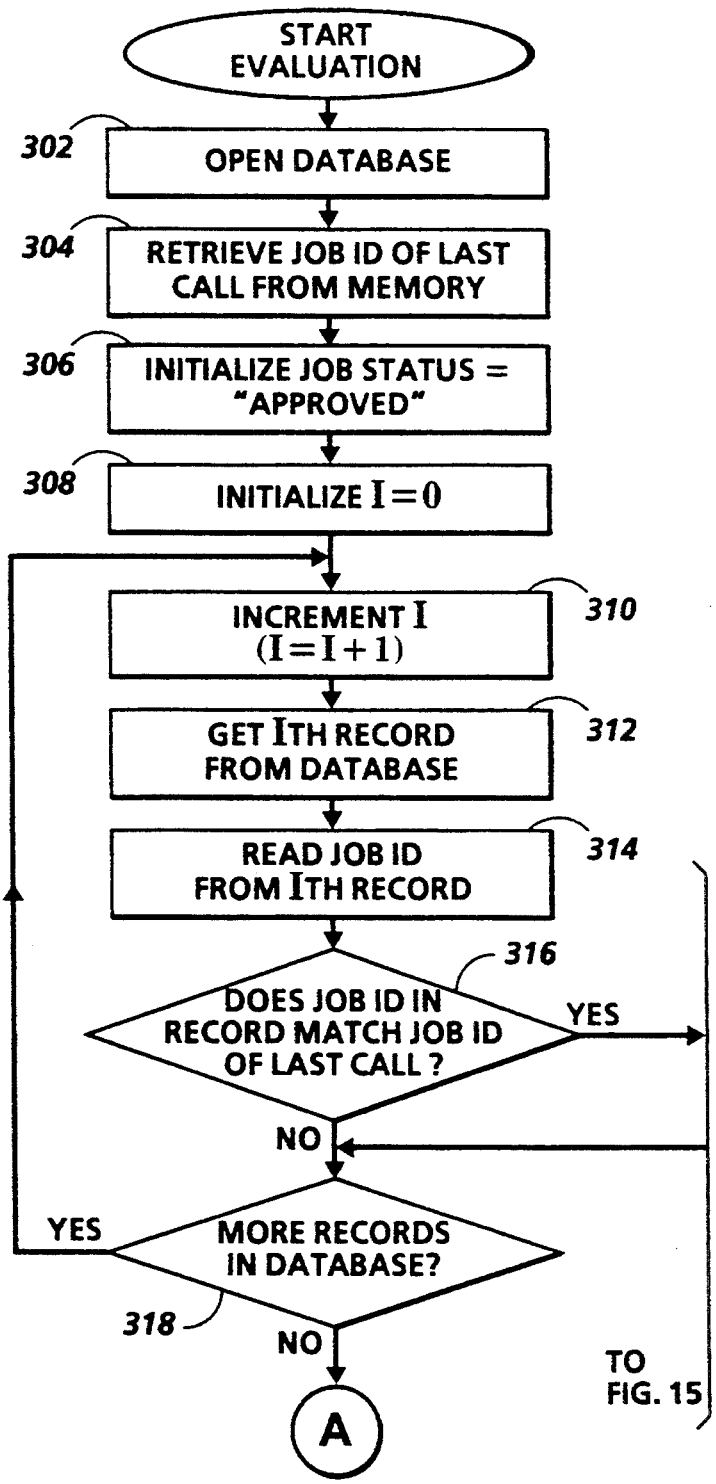

Referring to FIG. 14, to evaluate the status of a given job (more particularly all the lines 224 of the database in FIG. 17 pertaining to the job) the database is opened (step 302) and the job identifier of the last call from memory is retrieved at step 304. That is, the routine of FIG. 14 is set to analyze proof decision data of the first entry of the last job referenced in step 296 of the routine of FIG. 13. For the first entry of the job under analysis, which, in one example, could be Job-01 of FIG. 17, the "PROOF DECISION" subentry, is set, via step 306, to "APPROVED". As will appear this status remains the same, or changes, as a function of the proof decision data entered by the proof user. At step 308, an index, namely I, is initialized and, at step 310, the value is incremented such that the first (or next) unread entry of the database (in one example, the first entry of Job-01 (FIG. 17)) is retrieved (step 312) and the job identifier is read (step 314). If the job identifier is not consistent with the job being analyzed (see step 316), then, in view of the check for more database records, at step 318, the process either loops back to step 310, so that another entry can be retrieved, or proceeds to the routine of FIG. 16, where the job, as a whole, is classified as either "CONDITIONALLY APPROVED", "REJECTED", "INCOMPLETE" or "APPROVED".

Assuming the job identifier of the current entry is consistent with the job being analyzed, the proof decision data, i.e. the information corresponding with PROOF DECISION (FIG. 17), is read (step 322) (FIG. 5) and the segment of the current entry is classified as either "REJECTED" (steps 324 and 326), "CONDITIONAL" (steps 328 and 330), or "APPROVED" or "INCOMPLETE" (steps 332 and 334). If the current entry is classified as "REJECTED" or "INCOMPLETE" then the process proceeds to the routine of FIG. 16, otherwise the process proceeds to read more entries, if necessary. In the example of FIG. 17, for Job-01, the value of I would be 4. Additionally, the first entry of Job-01 would be classified as INCOMPLETE since no proof decision data is available for the entry having the proof entry code of 056.

Figure 15:
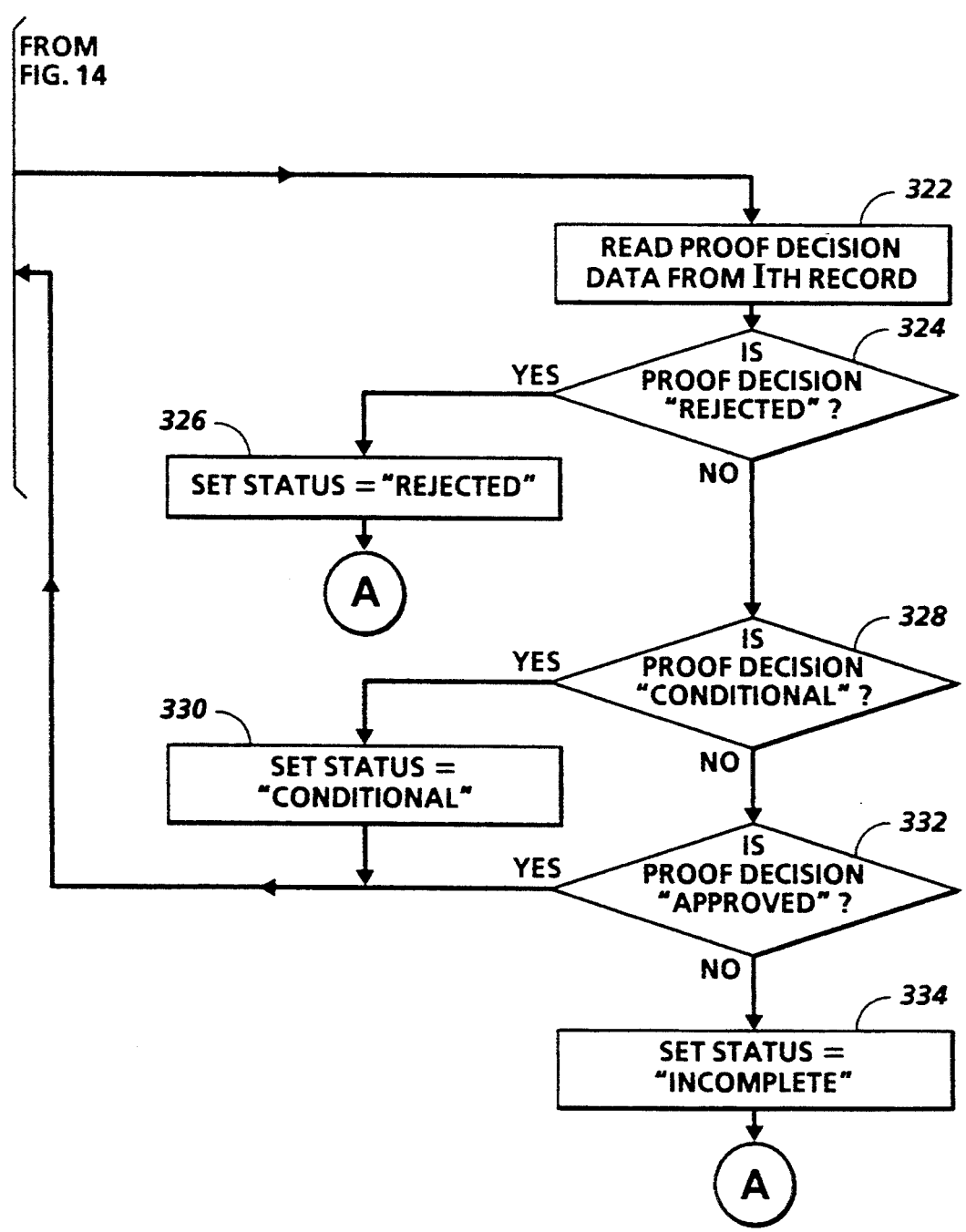
Figure 16:
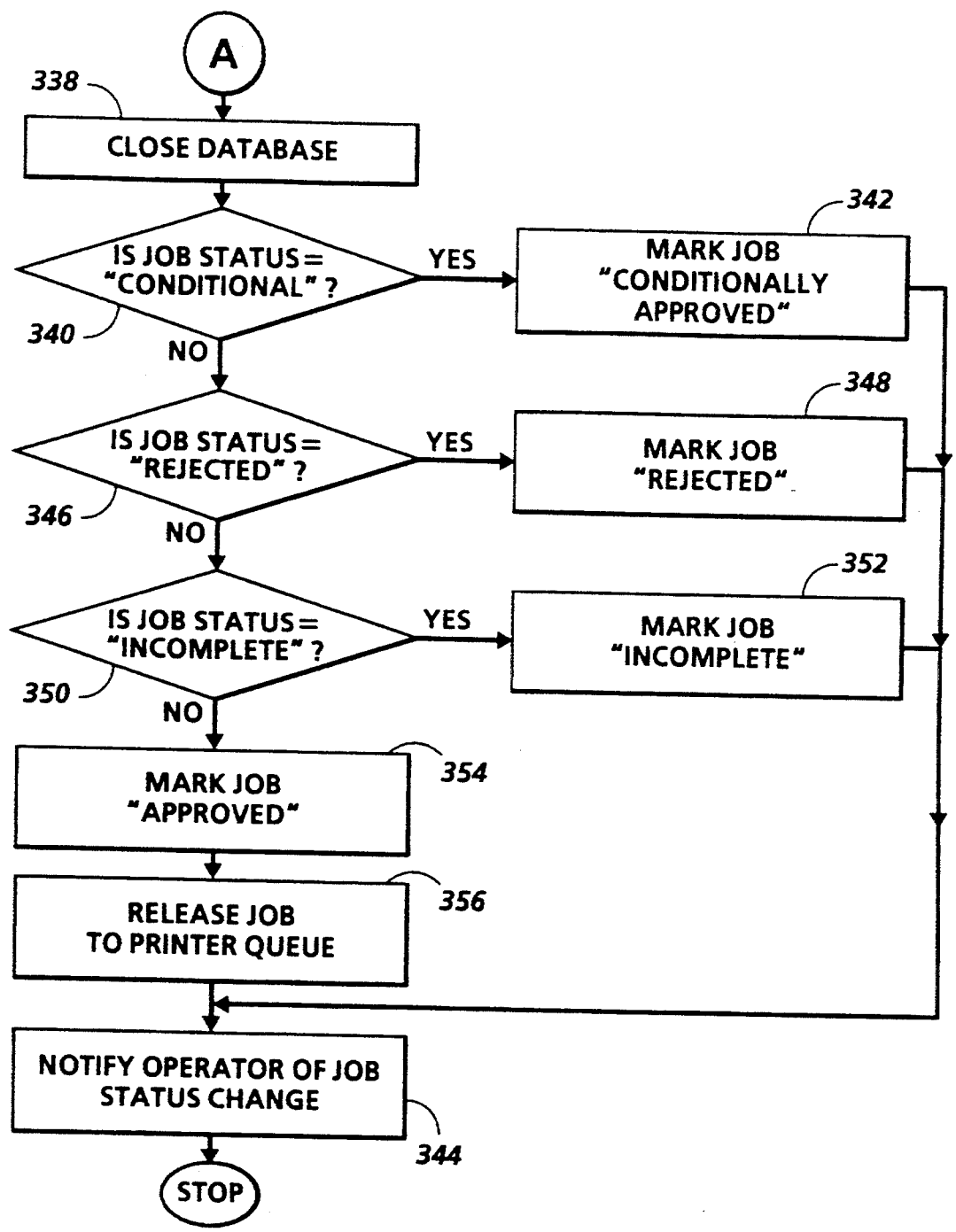

Upon classifying one or more entries for a job, per the routine of FIGS. 14 and 15, the process proceeds to FIG. 16 where the job, as a whole, is classified. At step 338, the proof registry database is closed and job status is checked at step 340 to determine if it is CONDITIONAL. Referring back to FIGS. 14 and 15, a job is conditional if each entry of the Job is classified as either APPROVED or CONDITIONAL. Referring again to FIG. 16, if the status of the job is CONDITIONAL, the job is marked as such (step 342) and the operator is notified of the job status at step 344. At step 346, the job is checked to determine if it is REJECTED. Referring back to FIGS. 14 and 15, a job is designated as REJECTED if even just one entry is determined to have a status of REJECTED. A job is designated as INCOMPLETE if even just one entry is determined to have a status of INCOMPLETE (or no status).

Referring again to FIG. 16, if the job has a status of REJECTED, then the job is marked as such (step 348), otherwise, at step 350, a check is performed to determine if the job is INCOMPLETE. If any entries are missing from the job, then the job is marked INCOMPLETE (step 352), otherwise, the process proceeds to step 354 where the job is marked as APPROVED. Preferably, each job that is marked as APPROVED, at step 356, is released to the printer 165 (FIGS. 7-9). In the illustrated embodiment of FIG. 16, the system operator is notified of the release of step 356; however, such notification would not be required in another embodiment since in this other embodiment, an approved job would be moved from the job file to the print queue, by a print manager, transparent of any proof user and/or system operator. A print manager capable of performing such moving operation exists on the current version of Xerox' DocuTech ® printing system.

The above-described technique of FIGS. 11-16 is summarized below for a job with multiple segments in which each segment is associated with a plurality of proof users. Initially (FIG. 11), a set including a segment copy, along with special instructions indicating a manner in which the segment copy should be reviewed and responded to, is generated for each of the proof users involved. In turn, each set is transmitted electronically, or by way of hardcopy, to each one of the proof users of the job. In response to receiving the sets, the respective proof users respectively review the segment copies and correspond with a database, associated with a printing machine, by way of a communication link. For each proof user, the database records proof decision data at a given entry (FIGS. 13 and 17), provided previous proof decision data has not been entered at that entry. Under certain circumstances, the technique prevents a proof user from overwriting previously provided proof decision data.

Over a selected time interval, each database entry corresponding with the job is checked (FIGS. 14 and 15) for the existence of proof decision data, or, more specifically, the existence of a subentry referred to as "PROOF DECISION". According to the preferred embodiment, proof decision data can indicate that a particular segment copy is "APPROVED", "CONDITIONAL" or "REJECTED". When no proof decision data is received for a particular segment copy, a status classification of "INCOMPLETE" is designated. As proof decision data is received, the status of the job, as a whole, is updated (FIG. 16) to reflect that the job is either "APPROVED", "CONDITIONAL", "REJECTED" or "INCOMPLETE". The following truth table summarizes the conditions supporting each of the above job status classifications:

| Job Status | Prerequisite Event(s) |
| --- | --- |
| APPROVED | All Segment Entries Approved. |
| CONDITIONAL | One or more Segment Entries Conditionally Approved and All Others Approved |
| REJECTED | One Segment Entry Rejected. |
| INCOMPLETE | One Segment Entry Missing and No Segment Entry Rejected. |

The status of the job is provided to the system operator and approved jobs are preferably released to a print queue. In one example an approved job is transferred automatically from a job file to the print queue for printing.

In one example of the above-described technique, one of the proof users, such as an originator of the job which is being proofed, may be provided with a special event code which would serve as an index for subsequent printing of the job. In particular, after a first set of the job is printed, the special code is converted into the index. Accordingly, when the proof user associated with the index calls into the printing system, the related database software knows that the stored job is to be printed so the system obtains information from the proof user, regarding a number of sets required for printing, and provides a copy of the job from the job file to the print queue.

Numerous features of the above-disclosed embodiment will be appreciated by those skilled in the art:

One feature of the disclosed embodiment is that a complete system, which tracks, statuses and manages a proof job, is provided. In contrast to systems that merely track and status a job, the presently disclosed system stores a job and prints it when a selected status is obtained. In one example, the stored job can be transferred automatically from a job file to a print file so that the job is placed in a queue for eventual printing.

Another feature of the disclosed embodiment is that communication with a printing machine of a printing system, for purposes of proofing,, is greatly enhanced. In particular, a first memory section, in which the database resides, can be accessed readily at any time by a proof user, provided the printing system is in an active state. Accordingly, the printing system operator need not be present to receive proof-related information. At the same time, the proof user can receive a set including a segment copy and special instructions by way of various I/O options. Moreover, the first memory section can be disposed remotely of the printing machine and the proof-related information can be delivered to the user by way of many I/O options, e.g., FAX, Telephone, Scanner and/or Workstation.

Yet another feature of the disclosed embodiment is that the printing of the instruction sheet is coordinated with the printing of the corresponding segment proof copy. Accordingly, they can be easily packaged together for distribution to the proof user.

Yet another feature of the disclosed embodiment is that it protects the integrity of information stored in the database. More particularly, a proof user is not permitted to modify proof-related information, previously written to the database, unless the proof-user expresses a desire to do so. In no event, can a proof user overwrite proof-related information associated with a job if that job has already been printed.

Yet another feature of the disclosed embodiment, is that the proofing process is facilitated greatly for both the proof user and the printing system operator. In particular, less effort is required of the printing system operator in tracking, statusing, and managing print jobs, thus allowing for cost savings and improved productivity. Moreover, reduced human involvement in the proofing process alleviates the possibility of confusion and errors in the process.

Another feature of the disclosed embodiment is that proof decision data is classified in a manner that provides information regarding the job readily. More particularly, each entry is designated with a status classification so that, at any moment in time, the status of a corresponding job in the database, can be obtained. With the job status information, a system operator, or print manager, can determine what approval information is required to complete the proofing process for a given job or when a job is ready for release to an output, such as the printer.

What is claimed is:

1. In a printing system with a printing machine and a first memory area, a method of managing a print job and producing prints, from the print job, when selected electronic information resides in a list of the memory, comprising:

storing the print job in the first memory area;
identifying a segment of the print job;
establishing an event code for a proof copy of the print job segment;
registering the event code, electronically, in the list, so that the event code is associated with a selected proof user and mapped to the proof copy segment;
producing an electronic representation of the proof copy segment from the print job segment, the electronic proof copy segment being generated with a special instruction set, the special instruction set including the event code;
transmitting the representation of the electronic proof copy segment, along with the special instruction set, to the selected proof user, wherein, in response to receiving the special instruction set, the selected proof user provides a set of proof-related information, in electronic form, to the printing system, by reference to the event code;
referring to the event code, electronically updating the list, with the proof-related information, when a preselected condition is met; and in response to said electronic updating, operating the printing machine to produce one or more prints representative of the stored print job.

2. The method of claim 1, in which the printing system includes a second memory area, wherein said operating step includes moving the print job from the first memory area to the second memory area for producing the prints of the stored print job.

3. The method of claim 2, further comprising coupling both the first memory section and the second memory section with the printing machine.

4. The method of claim 2, further comprising the step of disposing a selected one of the first memory area and the second memory area remotely of the printing system.

5. The method of claim 1, wherein said transmitting includes:
 prior to electronically updating the list, determining whether proof decision data exists in the list; and
 in response to determining that proof decision data exists in the list, indicating to the proof user, that the list has already been provided with proof decision data corresponding to the event code so that the proof user does not inadvertently overwrite previously provided proof decision data.

6. The method of claim 5, wherein said transmitting includes:
 prior to electronically updating the list, determining whether the print job has been printed; and
 preventing said electronic updating when it is determined that the print job has been printed.

7. The method of claim 1, wherein said transmitting step includes transmitting the representation of the electronic proof copy segment, along with the event code and the special instruction set, to a workstation, at which the proof user views the representation of the electronic proof segment.

8. The method of claim 1, wherein said transmitting includes transmitting the representation of the electronic proof copy segment, along with the event code and the special instruction set, to a printer, local to the proof user, at which printer the proof user produces one or more prints for proofing.

9. The method of claim 1, wherein said transmitting includes providing the set of proof-related information to the printing system with a telephone.

10. The method of claim 9, in which the proof-related information assumes a form of a telephone message, further comprising storing the message in the first memory area for eventual playback to an operator of the printing machine.

11. The method of claim 1, wherein said transmitting step includes:
 providing the set of proof-related information to the printing system in the form of a scannable instruction sheet;
 scanning the instruction sheet to read the proof-related information disposed thereon; and
 performing said electronic updating in response to said scanning.

12. The method of claim 1, wherein said transmitting step includes transmitting the representation of the electronic proof copy segment, along with the event code and the special instruction set, to the proof user, by way of a facsimile device.

13. The method of claim 1, wherein said transmitting step includes configuring the representation of the electronic proof copy segment in the form of a set of job instructions.

14. The method of claim 11, further comprising producing one or more copies of the stored print job, with the event code, subsequent to producing one or more prints representative of the stored print job.

15. The method of claim 1, in which the proof user does not provide the proof-related information to the printing system within a preselected time period, further comprising transmitting a message to the proof user indicating that his/her proof-related information is desired.

16. The method of claim 1, in which the proof user does not provide the proof-related information to the printing system within a preselected time period, further comprising causing said producing to be performed.

17. The method of claim 1, causing the preselected condition to occur when the list is not updated within a selected time interval.

18. The method of claim 1, in which the printing machine is operated by a printing machine operator, further comprising indicating to the printing machine operator, when the list is electronically updated, that the stored print job is ready to be printed.

19. In a printing system with a job file and a print queue where a selected print job is stored in the job file, the printing system including a database for maintaining proof-related information regarding the selected print job, an improved method of printing the selected print job comprising:
 transmitting, to a proof user, a representation of at least a segment of the selected print job and a special instruction sheet, the special instruction sheet having a proof event code and instructions regarding both a manner in which the proof user is to review the selected print job segment and provide proof-related information, regarding the selected print job segment, to the database;
 receiving, at the database, proof-related information for the selected print job segment, the proof-related information for the selected print job segment being identified with the proof event code and including proof decision data;
 updating the database with the proof decision data, by reference to the proof event code; and
 in response to said updating, moving a copy of the selected print job, from the job file to the print queue, so that prints, representative of the selected print job, are produced.

20. The method of claim 19, in which the printing system includes a printing machine, further comprising disposing the job file remotely of the printing machine and disposing the print queue in the printing machine.

21. The method of claim 19, wherein said transmitting includes:
 prior to electronically updating the list, determining whether proof decision data exists in the list; and
 in response to determining that proof decision data exists in the list, indicating to the proof user, that the list has already been provided with proof decision data corresponding to the event code so that the proof user does not inadvertently overwrite previously provided proof decision data.

22. The method of claim 21, wherein said transmitting further includes:
 prior to electronically updating the list, determining whether the print job has been printed; and preventing said electronic updating when it is determined that the print job has been printed.

23. The method of claim 19, wherein said transmitting step includes transmitting the representation of the electronic proof segment, along with the event code and the special instruction set, to a workstation, at which the proof user views the representation of the electronic proof segment.

24. The method of claim 19, wherein said transmitting includes providing the set of proof-related information to the printing system with a telephone.

25. In a printing system with a first memory communicating with a second memory where a selected print job is stored in the first memory, the printing system including a database for maintaining proof-related information regarding the selected print job, an improved method of outputting the selected print job comprising:

receiving, at the database, sets of proof-related information for the selected print job, each set being identified with a proof event code and including proof decision data, the proof decision data indicating whether a proof user deems a portion of the job to be in one of a first state and a second state;

updating the database with the proof decision data, by reference to each proof event code, so that the database reflects whether each job portion is in the first state or the second state;

assessing the respective states of the job portions; and outputting the job when it is determined, by way of said assessing, that each job portion is in the first state.

26. The method of claim 25, in which the proof decision data indicates that a proof user deems one of the job portions to be in a third state, further comprising prohibiting output of the job when any portion of the job is deemed, by a proof user, to be in the third state.

27. The method of claim 25, wherein said outputting comprises producing a print set representative of the job.

28. The method of claim 27, wherein said outputting includes moving the print job from the first memory to the second memory for accomplishing said producing.

29. A printing system for producing prints, representative of a selected print job, the printing system including an electronic job file for storing a selected print job, comprising:

means for transmitting, to a proof user, a representation of a segment of the selected print job and a special instruction sheet, the special instruction sheet having a proof event code and instructions regarding both a manner in which the proof user is to review the selected print job segment and provide proof-related information regarding the selected print job segment;

a database for receiving the proof-related information for the selected print job segment, the proof-related information for the selected print job segment being identified with the proof event code and including proof decision data, wherein the database is updated with the proof decision data, by reference to the proof event code; and a print machine for receiving an electronic copy of the selected print job, from the job file, and producing the prints, of the selected print job.

30. The printing system of claim 29, in which the printing system includes a print queue, further comprising moving the selected print job from the job file to the print queue in order to accomplish the production of prints.

* * * * *